United States Patent
Aggarwal et al.

(10) Patent No.: US 11,113,777 B1
(45) Date of Patent: Sep. 7, 2021

(54) TECHNIQUES FOR DETECTING AND MANAGING CONGESTION WITHIN A WORKSPACE

(71) Applicant: Amazon Technologies, Inc., Seattle, WA (US)

(72) Inventors: Aayush Aggarwal, Medford, MA (US); Vishnu Ayyagari, Boxboro, MA (US); James Plumley, Pelham, NH (US)

(73) Assignee: Amazon Technologies, Inc., Seattle, WA (US)

( * ) Notice: Subject to any disclaimer, the term of this patent is extended or adjusted under 35 U.S.C. 154(b) by 279 days.

(21) Appl. No.: 16/271,200

(22) Filed: Feb. 8, 2019

(51) Int. Cl.
| | | |
|---|---|---|
| *G06Q 50/28* | (2012.01) | |
| *G06Q 10/06* | (2012.01) | |
| *G01C 21/20* | (2006.01) | |
| *G05D 1/02* | (2020.01) | |
| *G01C 21/34* | (2006.01) | |
| *G05D 1/00* | (2006.01) | |

(52) U.S. Cl.
CPC .......... *G06Q 50/28* (2013.01); *G01C 21/206* (2013.01); *G01C 21/34* (2013.01); *G05D 1/0088* (2013.01); *G05D 1/0221* (2013.01); *G06Q 10/06315* (2013.01); *G06Q 10/06395* (2013.01); *G05D 2201/0216* (2013.01)

(58) Field of Classification Search
CPC ............. G06Q 50/28; G06Q 10/06315; G06Q 10/06395; G05D 1/0088; G05D 1/0221; G05D 2201/0216; G01C 21/34; G01C 21/206
See application file for complete search history.

(56) References Cited

U.S. PATENT DOCUMENTS

| | | | |
|---|---|---|---|
| 8,280,547 B2 | 10/2012 | D'Andrea et al. | |
| 9,087,314 B2 | 7/2015 | Hoffman et al. | |
| 9,829,333 B1 * | 11/2017 | Calder | G08G 1/166 |
| 10,209,711 B1 | 2/2019 | Brazeau | |
| 2012/0143427 A1 | 6/2012 | Hoffman et al. | |
| 2017/0357263 A1 | 12/2017 | Glatfelter et al. | |

OTHER PUBLICATIONS

U.S. Appl. No. 16/271,334, filed Feb. 8, 2019 "Techniques for Obstacle Detection and Avoidance".
U.S. Appl. No. 15/279,264, "Techniques for Contention Resolution for Mobile Drive Units", filed Sep. 28, 2016, 67 pages.

* cited by examiner

*Primary Examiner* — Anne Marie Antonucci
(74) *Attorney, Agent, or Firm* — Kilpatrick Townsend & Stockton LLP

(57) ABSTRACT

Systems and methods are provided herein for detecting congestion within a workspace. Historical navigational data may be obtained that indicates a number of locations for mobile drive units of the workspace over various historical time periods. Planned path data for each MDU may be obtained, the planned path data may indicate planned paths of travel for each MDU. A grid of overlapping volumes may be generated for the workspace and each instance of historical navigational data and/or planned path data may be utilized to map historical and/or future locations of the MDUs to corresponding volumes of the grid. A protocol set may be implemented to detect congested volumes based at least in part on the historical navigational data and/or the planned path data for each volume of the grid over one or more time periods. In response to detecting a congested volume, one or more remedial actions may be performed.

20 Claims, 8 Drawing Sheets

TECHNIQUES FOR DETECTING AND MANAGING CONGESTION WITHIN A WORKSPACE

BACKGROUND

Modern inventory systems, such as those in storage and/or sortation facilities (e.g., a warehouse, sortation warehouse) face significant challenges with respect to managing items in inventory. Items may be moved from one location to another within a facility. These functions can be performed by a myriad of robotic devices (e.g., mobile drive units (MDUs)). As these devices travel about the storage facility, one or more areas of congestion may occur. Current systems may fail to identify congestion and/or conventional congestion identification techniques may be inaccurate.

Absent, ineffective, and/or inaccurate congestion processing may lead to delays in task completion that may negatively affect the performance of the MDUs operating in the storage/sortation facility, individually, or as a whole. Embodiments of the invention address these and other problems.

BRIEF DESCRIPTION OF THE DRAWINGS

Various embodiments in accordance with the present disclosure will be described with reference to the drawings, in which.

DETAILED DESCRIPTION

Figure 1:
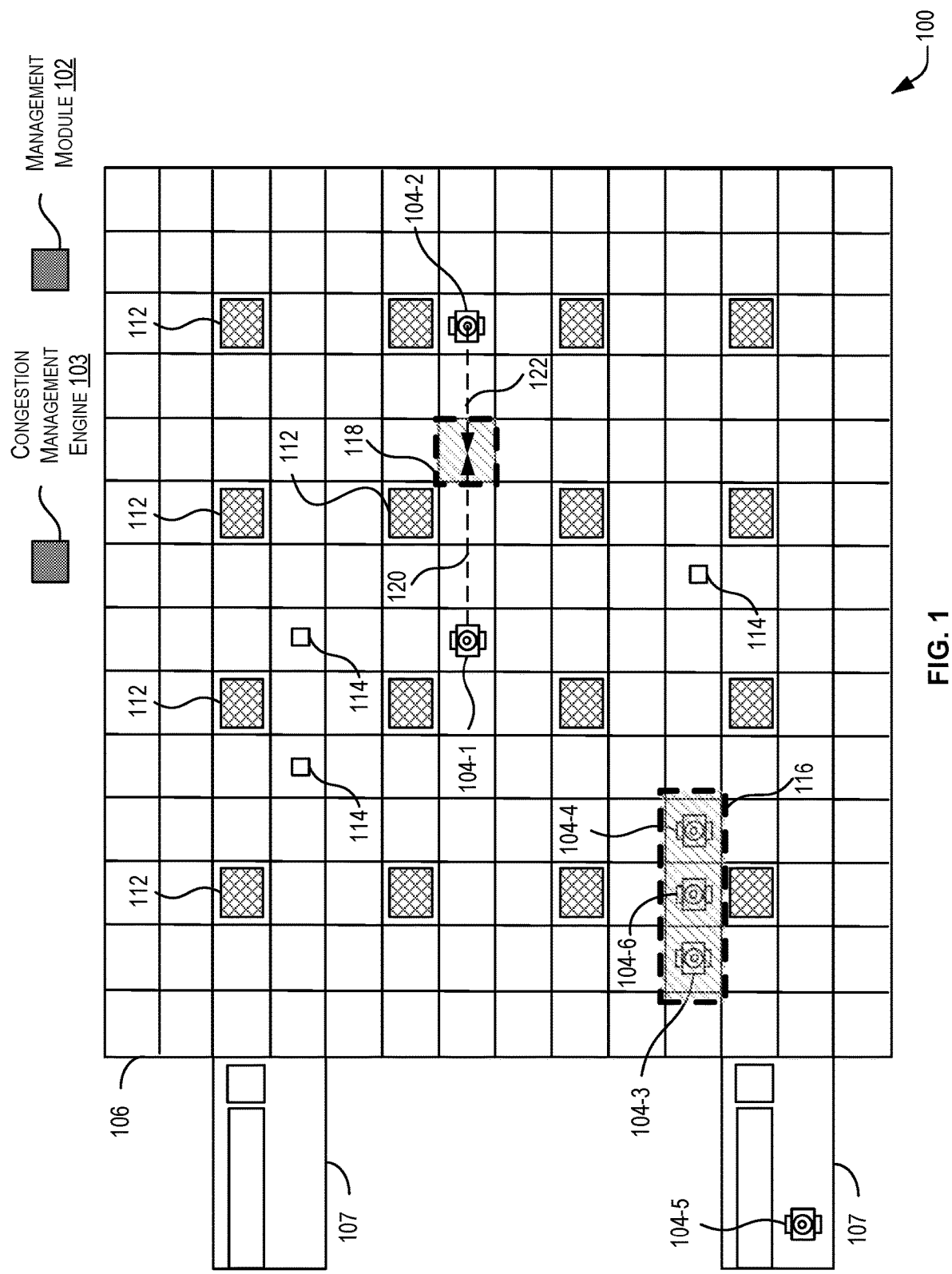
FIG. 1 is a schematic diagram illustrating an example environment suitable for implementing aspects of a congestion management engine, in accordance with at least one embodiment.

Techniques described herein are directed to systems and methods for detecting and/or avoiding congestion within a workspace. Although examples throughout may utilize warehouses, sortation facilities, storage facilities, and/or warehouse machinery for illustrative purposes, it should be appreciated that any example herein may be equally applied to other suitable contexts. As used herein, "congestion" is intended to refer to a condition associated with an area of a workspace that indicates that activities performed within that area are likely to be delayed beyond an acceptable delay time. Throughout the description below, examples that utilize one or more MDUs may equally apply to situations that include any suitable combination of one or more MDUs and/or one or more user devices (e.g., an electronic device worn, carried, operated by, or otherwise generally associated with an individual within the storage facility). Any functionality described with respect to the management module described herein may be provided to and/or by an MDU and/or a user device. Thus, it is envisioned that the management module discussed herein may provide congestion detection and/or avoidance involving any suitable combination of one or more MDUs and/or one or more individuals within a workspace (e.g., a storage facility, a sortation facility, etc.). Accordingly, any of the examples herein that utilize an MDU may be similarly applied to use cases involving a user device.

In at least one embodiment, a management module may be responsible for determining tasks and assigning individual tasks to individual MDUs within a storage and/or sortation facility operated by, or on behalf of an electronic marketplace provider (e.g., an online retailer of physical items). For example, the management module may determine that an item (e.g., a single item, a pallet, a cart, or any suitable container that stores one or more items) is to be moved from a first location (e.g., a receiving workstation) to a second location (e.g., a designated storage location within a storage facility, a destination location within a sortation facility, etc.). The management module may determine a storage and/or destination location for the item based on any suitable techniques.

In at least one embodiment, the management module may determine a particular MDU of a set of MDUs operating in the facility. The particular MDU may be selected, for example, based at least in part on the first location, the second location, a location of the particular MDU, or any suitable combination of the above. For example, an MDU that is closest to the first location may be selected. The management module (or individual components/agents of the management module associated with individual MDUs) may generate a set of commands that instruct the MDU to perform a task (e.g., retrieve the item from the first location and deliver it to the second location). In some embodiments, the management module (or a component of the management module) may generate and incrementally provide the set of commands to the tasked MDU. The management module may wait to provide another command until it receives an indication from the MDU that it has successfully completed the previous command.

In at least one embodiment, the MDUs may be configured to provide navigational data that indicates respective locations of the MDUs over time. In some embodiments, the navigational data may correspond to any suitable number of time periods (e.g., 2 second time periods, 500 millisecond time periods, etc.). In some examples, each MDU in the workspace may transmit data indicating its current location periodically, at any suitable frequency, upon completion of an assigned task, or the like. A congestion management engine (e.g., operating as part of the management module or as a separate service/process/standalone module) may be configured to identify areas of congestion within the workspace based at least in part on the navigational data provided by the MDUs of the workspace. The functionality of the congestion management engine may be executed at any suitable time. By way of example, the congestion management engine may be configured to execute various congestion detection operations periodically, at a set frequency (e.g., every 500 millisecond), according to a predetermined schedule, or the like.

In some embodiments congestion management engine may be configured to detect congestion already occurring (or having already occurred in the past) within the workspace. In some embodiments, the congestion management engine may generate and/or obtain a set of overlapping volumes (e.g., a grid of overlapping volumes), each volume corresponding to a sub-area of the workspace. The congestion management engine may utilize the navigational data provided by the MDUs to generate, a density value for each volume that indicates a number of components (e.g., MDUs) within the volume during a particular time period (e.g., the last 500 milliseconds). In some embodiments, the congestion management engine may filter out idle and/or stationed MDUs prior to generating the density value. In some embodiments, the congestion management engine may discard any volumes for which the density value does not exceed a predefined threshold value (e.g., 3, 4, 8, etc.) to obtain a set of highly dense volumes. For each of the highly dense volumes, the congestion management engine may generate numerous density values that indicate the number of components within a highly dense volume during a number of historical time periods (e.g., the 500 milliseconds prior to the last 500 milliseconds, 500 milliseconds further in the past, etc.). The most current density value of a volume, and the various density values of the volume that correspond to the historical time periods, may together be referred to as "historical density values." In some embodiments, the congestion management engine may utilize a predetermined protocol to determine, from the historical density values, particular volumes that are congested. The specific protocol will be discussed further below with respect to the following figures.

Once congested volumes are identified utilizing the techniques discussed herein, the congestion management engine may be configured to generate supplemental data for each of the congested volumes. "Supplemental data" is intended to include any suitable data related to the congestion. For example, the congestion management engine may identify particular MDU identifiers corresponding the MDUs that have been within the congested volume over the last N instances of navigational data, where N is a whole number and may be predefined. As another example, the supplemental data may include a respective speed of each MDU within the congested volume over a particular time period and/or an average speed of the MDUs within the congested volume over a particular time period. It should be appreciated that data processing efforts may be reduced by calculating such supplemental data only for identified congested volumes rather than for every volume in the grid. The supplemental data may be stored in any suitable storage location (e.g., an in-process cache, a data store, etc.) that is configured to store such information. In some embodiments, the congestion management engine may be configured to push an identifier of a congested volume and corresponding supplemental data to another system (e.g., a path planning module of the management module) for further processing.

The congestion management engine may be configured to perform one or more remedial actions based at least in part on the congested volumes identified and/or the supplemental data generated for those congested volumes. By way of example, a remedial action may include providing a notification of the congested volume, causing modification of at least one path corresponding to at least one of the MDUs, and/or causing at least one path to be generated for at least one of the MDUs of the workspace.

In some embodiments, the congestion management engine may proactively identify congestion that has not yet occurred. By way of example, the congestion management engine may be configured to obtain/retrieve planned paths for any suitable number of the MDUs within the workspace. In some embodiments, the planned paths may be requested and obtained from the management module and/or a storage location configured to store planned path data which may be accessible to the congestion management engine. The congestion management engine may map out at least some portion (e.g., the next ten seconds) of the planned paths of each MDU. Utilizing this portion of the planned path data, the congestion management engine may again generate and/or utilize the set of overlapping volumes (e.g., a grid of volumes) to calculate a density value for each volume. These density values may be utilized to identify "highly dense volumes" in which the planned paths indicate a number of MDUs (e.g., a density value) that exceeds a threshold number of MDUs. As described above, idle and/or stationed MDUs may be filtered out prior to determining these highly dense volumes. The density values identified utilizing the planned path data together with some portion of the historical density values generated above may be utilized to further identify additional congested volumes. Thus, additional congested volumes may be identified based on, not just historical navigational data, but on planned path data describing where the MDUs will be in the future (e.g., the next ten seconds, the next 20 seconds). It should be appreciated that multiple instances of planned path data corresponding to multiple time periods (e.g., the next 10 seconds, the next 20 seconds, the next 30 seconds, etc.) may be utilized alone or in combination with historical density values to identify congested volumes. The congestion management engine may perform one or more remedial actions based at least in part on identifying future congested volumes based on future density values calculated utilizing planned path data. These remedial actions may be the same or different from the remedial action performed in response to the congested volumes determined from historical density value.

It should be appreciated that the techniques discussed above are applicable in contexts other than inventory situations. The techniques disclosed herein provide, at least, a system and method detecting and/or avoiding congestion within a workspace. Utilizing the techniques discussed herein, the inventory system may operate more efficiently with respect to the MDUs/user devices operating within facility as task completion delays may be reduced by accurately identifying congestion within the system. One or more remedial actions (e.g., determining alternative path(s), altering previously assigned paths, ensuring future paths avoid congestion, etc.) may be performed based at least in part on the congestion identified.

Embodiment of the present invention may provide numerous benefits over previous techniques. Conventional path planning techniques employ a greedy approach for planning paths that does not take into account the path plans being executed by other MDUs. In some congestion detection systems, congestion may not be accurately identified. Congestion processing utilizes processing resources of the system. Misuse of these processing resources can be burdensome to the system. Accordingly, misclassifying areas as being congested may lead to wasted processing resources and inefficient utilization of the workspace as a whole.

Additionally, conventional approaches to path planning may not take into account potential future congestion which may also lead to waste processing resources and inefficient utilization of the workspace. This disclosure is directed to improvements to congestion detection and avoidance techniques that may be utilized to reduce the likelihood that areas of a workspace are misclassified as being congested and increase the likelihood that future congestion is avoided. Through utilizing these techniques, efficient use of the workspace may be optimized and wasteful processing may be avoided.

FIG. 1 is a schematic diagram illustrating an example environment 100 suitable for implementing aspects of a congestion management engine 103, in accordance with at least one embodiment. The environment 100 may include a management module 102 and one or more mobile drive units (MDUs) (e.g., the MDUs 104-1, 104-2, 104-3, 104-4, 104-5, 104-6, collectively referred to as "MDUs 104") operating within a workspace 106 (e.g., a sortation facility where items are sorted, or the like). Although workspace 106 may be depicted in FIG. 1 as a sortation facility, it should be appreciated that the techniques described herein may apply to other contexts (e.g., a storage facility, a warehouse, etc.).

The management module 102 may be configured to manage various task assignments and navigational aspects of the MDUs 104 with the workspace 106. Each of the MDUs 104 may be configured to move items within the workspace 106. Additional elements within the workspace 106 may include one or more of the receptacles 112. In some embodiments, the workspace 106 may include transfer areas 107 where items may be obtained/provided by the MDUs 104 and conveyed to various delivery locations (e.g., receptacles 112, a shipping location, etc.). It should be appreciated that the workspace 106 may include additional elements and/or components not depicted in FIG. 1.

The receptacles 112 may be in various forms. By way of example only, the receptacles 112 may be in any suitable form and configured to receive one or more items. Some of the receptacles 112 may include storage locations and/or containers configured to receive and store one or more physical items. For example, the receptacles 112 may include bins, shelves, racks, or the like. In some examples, the receptacles 112 may include an opening through which items may be deposited (and potentially transported or directed) to a storage container (e.g., a portable storage container, a stationary storage container, etc.).

As a non-limiting example, the workspace 106 may include an elevated floor upon which the MDUs 104 may operate. The receptacles 112 may include an opening within the elevated floor of workspace 106 through which items may be deposited by the MDUs 104. In some examples, the floor may or may not be elevated and the receptacles 112 may include an opening (e.g., directed upward or downward) through which items may be deposited. Storage containers (not depicted) may be placed near to (e.g., below, above, etc.), or may otherwise be attached to, the receptacles 112. An item may be deposited into the receptacles 112 and transported (e.g., via a shoot, a conveyor belt, another MDU/transportation device, or the like) to a storage container (e.g., a bin, a crate, a vehicle, or the like). The storage container may store the item on a temporary or permanent basis. Each of the receptacles 112 may be associated with an identifier that identifies a particular receptacle from the group.

As another non-limiting example, the receptacles 112 may include a storage container on which one or more items may be placed for storage. The receptacles 112 may be a shelving system and/or a storage container having any suitable number of storage containers within which the MDUs 104 may place various items. Each storage container within the receptacles 112 may be associated with an identifier that identifies the particular storage container within the receptacles 112.

In some embodiments, the MDUs may transport any item (e.g., a physical item, the receptacles 112, etc.) between locations within the workspace 106. Accordingly, each of the MDUs 104 may be capable of moving items between locations within the workspace 106 to facilitate the entry, processing, sortation, storage management, and/or removal of items within the workspace 106 and the completion of other tasks involving items.

In at least one embodiment, the management module 102 may assign tasks to appropriate components of workspace 106 (e.g., the MDUs 104) and coordinate operation of the various components in completing the tasks. Although shown in FIG. 1 as a single, discrete component, the management module 102 depicted may represent multiple components and may represent or include portions of the MDUs 104 or other components of the environment 100. The management module 102 may be internal or external to the workspace 106. In some examples, the management module 102 may be communicatively connected to various components of the environment 100 via one or more networks (e.g., the Internet, a wireless network, a local area network, a cellular network, or the like).

The MDUs 104 may represent any devices or components appropriate for use in the workspace 106 based on the characteristics and configuration of the receptacles 112 and/or other components of workspace 106. In a particular embodiment of environment 100, the MDUs 104 represent independent, self-powered devices configured to freely move about the workspace 106. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. The MDUs 104 may be communicatively coupled to the management module 102 via any suitable communication means and according to any suitable communications protocol. It should be appreciated that the examples described herein, may similarly be utilized by any suitable device that is configured to utilize space to move, regardless of whether or not it is able to freely move about the workspace 106. Thus, the techniques herein may equally be applied to devices other than MDUs, such as robotic arms, for example.

The workspace 106 of FIG. 1 represents an area within which the MDUs 104 can move. For example, the workspace 106 may represent all or part of the floor of a mail-order warehouse and/or a sortation facility in which the MDUs 104 operate. Although FIG. 1 shows, for the purposes of illustration, a workspace 106 that includes a fixed, predetermined, and finite physical space, the workspace 106 may have variable dimensions and/or an arbitrary geometry. While FIG. 1 is intended to illustrate a particular embodiment in which the workspace 106 is entirely enclosed in a building, the workspace 106 may be unconstrained by any fixed structure.

In operation, the management module 102 may select particular MDUs of the MDUs 104 to perform particular tasks. Once a task (or many tasks) are assigned, the management module 102 may provide instructions to the MDUs 104. A task and instructions may include one or more sub-tasks. By way of example only, a task of storing a newly received item may include navigating to a particular location (e.g., transfer area 107, a particular receptacle of the receptacles 112, etc.) and travelling (e.g., along a planned path) to another location (e.g., another area of the workspace 106, one of the receptacles 112, etc.).

The MDUs 104 may be configured to receive task assignments (e.g., from the management module 102 directly, or indirectly. The MDUs 104 may transmit instruction requests (e.g., to the management module 102) and receive instruction responses (e.g., from the management module 102). An instruction request may include location information associated with a particular MDU such as a location identifier indicating a current location of the MDU. An instruction response may include information that instructs the MDU to perform particular operations (e.g., begin traveling along a particular heading at a particular speed). The management module 102 may be configured to manage space reservation to the MDUs 104 within the workspace 106. In some embodiments, the management module 102 may reserve space (e.g., a volume, an area, a location, etc.) within the workspace 106 for a particular MDU to execute some suitable portion of its assigned task.

In some embodiments, the workspace 106 may employ fiducial markers 114 that are placed within the workspace 106. The fiducial markers 114 can be embedded in a concrete floor of the workspace 106, or alternatively in a raised floor or supplemental surface disposed over an existing floor surface. The fiducial markers 114 can be distributed (e.g., in a grid-like pattern, in any suitable manner) throughout the workspace 106 and may encode location information via any suitable method (e.g., a location identifier encoded in a bar code, a QR code, MaxiCode, Data Matrix, EZ Code, or any suitable identifying tag or code may be employed, encoded or not).

As the MDUs 104 travel about the workspace 106, The MDUs 104 may be configured to obtain location information (e.g., via a sensor such as a bar code reader, a scanner, an image capture device, etc.) from the fiducial markers 114. Any suitable number of fiducial markers 114 may be utilized and the markers may be situated in any suitable configuration depending on the workspace in which they are utilized. In some embodiments, the MDUs 104 may be configured to determine location information via methods that do not include the fiducial markers 114. By way of example, the MDUs 104 may include a global positioning device which is capable of providing a location of the MDU. As another example, the MDUs 104 may utilize a camera or other suitable sensor for capturing an image of the workspace and determine location information based at least in part on analyzing the image according to any suitable image recognition techniques (e.g., to estimate location based on landmarks and/or markings identified within the image). The MDUs 104 may provide navigational data including current location, current state, current speed, planned speed, current heading, and/or other characteristics of the MDUs 104 to the management module 102 to provide updated awareness of the tasks and location of the MDUs 104. In some embodiments, an MDU may provide this navigational data periodically and/or incrementally to notify the management module 102 of its location and/or a completion or delay associated with a portion of its assigned task. The management module 102 may utilize the information provided by the MDUs 104 to determine and/or modify planned navigation paths, update task assignment, or any suitable operation related to task assignment and navigation of the MDUs 104 within the workspace 106. In some embodiments, the navigational data provided by the MDUs 104 may be stored for additional processing.

In some embodiments, the congestion management engine 103 (e.g., operating as part of the management module 102 or operating, at least in part, as a separate module) may utilize the navigational data provided by the MDUs to identify one or more congested areas (e.g., congested area 116) of the workspace 106. The congestion management engine 103 may be configured to identify the congested area 116 based at least in part on one or more instances of historically provided navigational data corresponding to multiple historic time periods (e.g., 10-20 seconds of the last minute, 20-40 seconds of the last minute, 40-60 seconds of the last minute). In some embodiments, the congestion management engine 103 may generate supplemental data describing various attributes of the congested area 116. The congestion management engine 103 may be configured to perform one or more remedial actions based at least in part on the identification of the congested area 116 and/or the supplemental data associated with the congested area 116.

In some embodiments, the congestion management engine 103 (e.g., operating as part of the management module 102 or operating, at least in part, as a separate module) may utilize planned path data associated with the MDUs 104 to identify one or more congested areas (e.g., congested area 118) that are to occur within the workspace 106 within a future time period (e.g., the next ten seconds, the next minute, etc.). The congestion management engine 103 may be configured to obtain planned path data indicating planned paths 120 and 122 for MDUs 104-1 and 104-2, respectively. This planned path data may correspond to a single future time period or multiple future time periods. In some embodiments the planned path data may be combined with the navigational data historically provided by the MDUs to identify congested area 118, or the congested area 118 may be identified without regard to the historically provided navigational data. In some embodiments, the congestion management engine 103 may generate supplemental data describing various attributes of the congested area 118. The congestion management engine 103 may be configured to perform one or more remedial actions based at least in part on the identification of the congested area 118 and/or the supplemental data associated with the congested area 118. The remedial actions performed with respect to the congested area 118 may be the same or may differ from the remedial actions performed with respect to the congested area 116.

Figure 2:
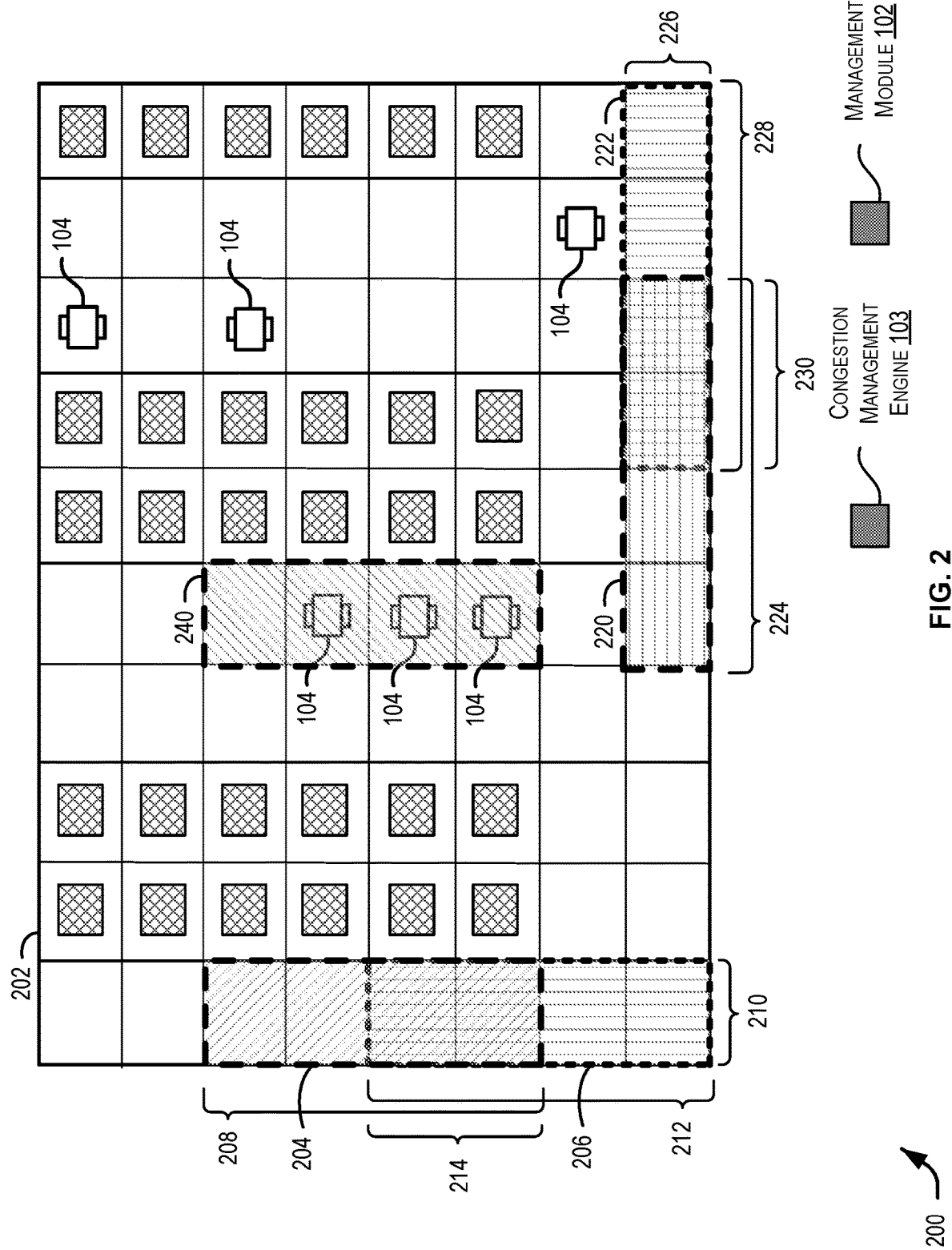
FIG. 2 is an additional schematic diagram illustrating techniques for generating a set of congested volumes within a workspace, in accordance with at least one embodiment.

FIG. 2 is an additional schematic diagram 200 illustrating techniques for generating a set of congested volumes associated with a workspace 202 (an example of the workspace 106 of FIG. 1), in accordance with at least one embodiment.

In some embodiments, the congestion management engine 103, operating as a standalone module or as part of the management module 102, may be configured to identify one or more congested areas based at least in part on navigational data associated with the MDUs 104. In an embodiment, the congestion management engine 103 may divide the workspace 202 into a grid of volumes such that every portion of the workspace 202 is associated with one or more volumes.

For example, the grid of volumes may be generated to include a set of vertical volumes (e.g., the vertical volume 204 and the vertical volume 206). The vertical volumes of the grid may be any suitable dimensions. By way of example, the vertical volume 204 may be generated to have a length 208 and a width 210 and the vertical volume 206 may be generated to have a length 212 and a width 210. In some embodiments, the length 208 and the length 212 may be equal. The length 208, the length 212, and/or the width 210 may be predetermined based at least in part on the processing resources of the congestion management engine 103 and/or the particular dimensions of the workspace 202, and/or the size/dimensions of MDUs 104. The dimensions of the vertical volumes may be identified to provide congested volume identification over some threshold accuracy while factoring in the processing resources needed in light of the particular dimensions of the vertical volumes. In some embodiments, the dimensions (e.g., length, width) of the vertical volumes may be adjustable such that they may be individually increased or decreased in order to optimize for accuracy and/or processing burden. For example, the dimensions of the dimensions of the vertical volumes may be increased to reduce the processing burden of the congestion management engine 103. In some embodiments, the length and/or width of the vertical volumes may correspond to a predetermined number of fiducial markers within the workspace 202 (e.g., the fiducial markers 114 of FIG. 1). By way of example, a length of the vertical volumes 204 and 206 may correspond to a total length associated with a number of vertical areas associated with a particular number of fiducial markers (e.g., 4 fiducial markers). As another example, the width 210 may be identified as being associated with the width of an area corresponding to a vertical column of fiducial markers as depicted in FIG. 2. It should be appreciated that the width and/or length of the vertical volumes may be identified according to any suitable unit such as a particular number of inches, feet, centimeters, or the like.

In at least one embodiment, the vertical volumes 204 and 206 may be situated with the grid to overlap by some amount. By way of example, the vertical volume 204 and the vertical volume 206 may overlap as depicted to provide an area of overlap 214. In some embodiments, the dimensions of the area of overlap 214 may be predetermined and/or identified based at least in part on the processing resources of the congestion management engine 103 and/or the particular dimensions of the workspace 202, and/or the size/dimensions of the MDUs 104. The dimensions of the area of overlap 214 may be identified to provide congested volume identification over some threshold accuracy while factoring in the processing resources needed in light of the particular dimensions of the vertical volumes. In some embodiments, the dimensions of the area of overlap 214 may be adjustable such that the dimensions may be increased or decreased in order to optimize for accuracy and/or processing burden of the congestion management engine 103. For example, the dimensions of the area of overlap may be decreased to reduce the processing burden of the congestion management engine 103. It should be appreciated that any suitable number of vertical volumes may be utilized with a grid so as to cover the whole area of the workspace 202 and that each vertical volume of the grid may overlap one or more other vertical volumes of the grid.

In some embodiments, the grid of volumes may be generated to include a set of horizontal volumes (e.g., the horizontal volume 220 and the horizontal volume 222). The horizontal volumes of the grid may be any suitable dimensions. By way of example, the horizontal volume 220 may be generated to have a length 224 and a width 226 and the horizontal volume 222 may be generated to have a length 228 and a width 226. In some embodiments, the length 224 and the length 228 may be equal. The length 224, the length 228, and/or the width 226 may be predetermined based at least in part on the processing resources of the congestion management engine 103 and/or the particular dimensions of the workspace 202. In some embodiments, the lengths 224 and/or 228 of the horizontal volumes may be the same or may differ from the lengths 208 and/or 212 of the vertical volumes of the grid. The dimensions of the horizontal volumes may be identified to provide congested volume identification over some threshold accuracy while factoring in the processing resources needed in light of the particular dimensions of the horizontal volumes. In some embodiments, the dimensions (e.g., length, width) of the horizontal volumes may be adjustable such that they may be individually increased or decreased in order to optimize for accuracy and/or processing burden. For example, the dimensions of the dimensions of the horizontal volumes may be increased to reduce the processing burden of the congestion management engine 103. In some embodiments, the length and/or width of the horizontal volumes may correspond to a predetermined number of fiducial markers within the workspace 202 (e.g., the width of a horizontal volume may correspond the fiducial markers 114 of FIG. 1). By way of example, a length of the horizontal volumes 220 and 222 may correspond to a total length associated with a number of horizontal areas associated with a particular number of fiducial markers (e.g., 4 fiducial markers). As another example, the width 226 may be identified as being associated with the width of an area corresponding to a horizontal row of fiducial markers as depicted in FIG. 2. It should be appreciated that the width and/or length of the horizontal volumes may be identified according to any suitable unit such as a particular number of inches, feet, centimeters, or the like.

In at least one embodiment, the horizontal volumes 220 and 222 may be situated with the grid to overlap by some amount. By way of example, the horizontal volume 220 and the horizontal volume 222 may overlap as depicted to provide an area of overlap 230. In some embodiments, the dimensions of the area of overlap 230 may be predetermined and/or identified based at least in part on the processing resources of the congestion management engine 103 and/or the particular dimensions of the workspace 202. The dimensions of the area of overlap 230 may be identified to provide congested volume identification over some threshold accuracy while factoring in the processing resources needed in light of the particular dimensions of the vertical volumes. In some embodiments, the dimensions of the area of overlap 230 may be adjustable such that the dimensions may be increased or decreased in order to optimize for accuracy and/or processing burden of the congestion management engine 103. It should be appreciated that any suitable number of horizontal volumes may be utilized with a grid so as to cover the whole area of the workspace 202 and that each horizontal volume of the grid may overlap one or more other horizontal volumes of the grid. It should also be appreciated that each horizontal volume of the grid may be generated to overlap one or more vertical volumes of the grid.

It should be appreciated that the vertical and/or horizontal volumes depicted in FIG. 2 are not intended to be limited in nature. A set of volumes may be generated to correspond to any orientation (e.g., vertical, horizontal, diagonal, etc.). In some embodiments, the orientation of the volumes generated may be utilized based at least in part on the potential directions of traversal corresponding to the MDUs 104. By way of example, while the MDUs of FIG. 2 may be configured to move vertically (e.g., in north/south directions) and/or horizontally (e.g., in east/west directions), in some embodiments, the MDUs may be configured to move diagonally (e.g., in a northeasterly/northwesterly/southeasterly/southwesterly direction) through the workspace 202. Accordingly, a respective set of volumes may be generated for each potential direction of traversal (e.g., a vertical set of volumes, a horizontal set of volumes, a diagonal set of volumes, etc.). Although the volumes of FIG. 2 are depicted as being rectangular in shape, it should be appreciated that the volumes may be differently shaped (e.g., an ellipse, a circle, a square, a trapezoid, a polygon, etc.). The particular shape of the volumes and/or the number and/or type of sets of volumes (e.g., horizontal, vertical, diagonal, etc.) may also be selected based at least in part on optimizing for congestion detection accuracy and/or a processing burden of the congestion management engine 103.

In some embodiments, the congestion management engine 103 may be configured to calculate density values for each volume of the grid based at least in part on navigational data and/or planned path data associated with the MDUs 104. An example of these operations will be discussed further below with respect to FIG. 3. Utilizing the grid of volumes and the density values associated with the volumes, a congested volume 240 may be identified. Although the congested volume 240 is depicted as a vertical volume, it should be appreciated that a horizontal volume (and/or a diagonal volume) may additionally or alternatively be identified as a congested volume. The congestion management engine 103 may be configured to generate supplemental data associated with the congested volume 240. Such supplemental data may include identifiers corresponding the MDUs that have been within the congested volume 240 over the last N instances navigational data, where N is a whole number and may be predefined. As another example, the supplemental data may include a respective speed of each MDU within the congested volume 240 over a particular time period and/or an average speed of the MDUs within the congested volume 240 over a particular time period. Any suitable number of congested volumes may be identified based at least in part on the navigational data and/or planned path data associated with the MDUs 104.

Figure 3:
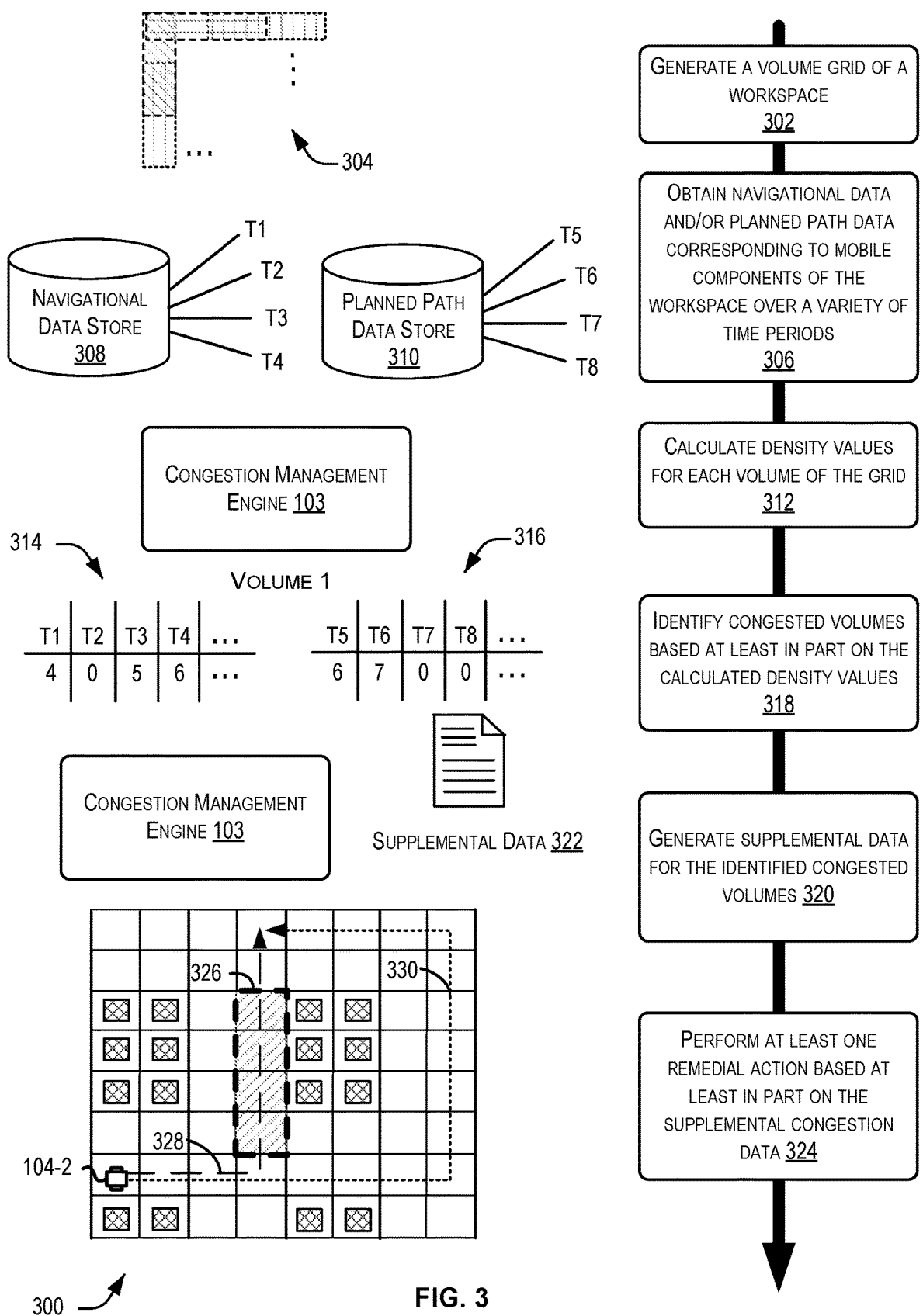
FIG. 3 is a block diagram illustrating an example method for performing at least one remedial action based at least in part on identifying supplemental data associated with one or more congested volumes, in accordance with at least one embodiment.

FIG. 3 is a block diagram illustrating an example method 300 for performing at least one remedial action based at least in part on identifying supplemental data associated with one or more congested volumes, in accordance with at least one embodiment. The operations discussed with respect to method 300 may be performed by the congestion management engine 103.

In at least one embodiment, the method 300 may begin at 302, where the congestion management engine 103 may generate a grid 304 of a workspace (e.g., the workspace 106 of FIG. 1, the workspace 202 of FIG. 2). In some embodiments, the congestion management engine 103 may be configured to access an electronic representation of the workspace (e.g., a digital map or any suitable electronic data defining the area of the workspace). Utilizing the electronic representation, the congestion management engine 103 may be configured to generate a set of overlapping volumes (e.g., a set of vertical volumes and/or a set of horizontal volumes). Each of the volumes may correspond to a sub-area of the workspace. In some embodiments, the grid may be generated by the congestion management engine 103 in the manner described in connection with FIG. 2.

At 306, the congestion management engine 103 may obtain navigational data and/or planned path data corresponding to mobile components (e.g., MDUs 104 of FIG. 1) of the workspace. In some embodiments, the navigational data and/or the planned path data may be stored and/or obtained from the navigational data store 308 and/or the planned path data store 310, respectively. It should be appreciated that in some embodiments, the navigational data and the planned path data may co-located at a single storage location.

In some embodiments, the navigational data may correspond to multiple historical time periods (e.g., T1-T4). By way of example T1 may be a most recent 0-10 seconds, T2 may correspond to 10-20 seconds in the past, T3 may correspond to 20-30 seconds in the past, and T4 may correspond to 30-40 seconds in the past. Any suitable number of historical time periods may be utilized that individually correspond to any suitable length of time (e.g., 500 milliseconds, 1 second, 10 seconds, 20 seconds, 2 minutes, etc.).

In some embodiments, the planned path data may correspond to one or more future time periods (e.g., T5-T8). By way of example T5 may correspond to the next 0-10 seconds with respect to a current time, T6 may correspond to 10-20 seconds in the future, T7 may correspond to 20-30 seconds in the future, and T8 may correspond to 30-40 seconds in the future. Any suitable number of future time periods may be utilized that individually correspond to any suitable length of time (e.g., 500 milliseconds, 1 second, 10 seconds, 20 seconds, 2 minutes, etc.).

At 312, the congestion management engine 103 may be configured to calculate density values for each volume of the grid. By way of example, the congestion management engine 103 may be configured to identify congestion that has already occurred within the workspace. In these embodiments, the congestion management engine 103 may utilize most recent navigational data from each of the MDUs 104 to identify a current location of each MDU within the workspace. In some embodiments, the congestion management engine 103 may ignore or otherwise filter MDUs that are determined (e.g., from corresponding navigational data) to be in an idle and/or stationed state. The locations of the MDUs may be mapped to a corresponding location of the grid, the corresponding location being associated with one or more volumes of the grid 304. The congestion management engine 103 may calculate current density values for each of the volumes of the grid 304 by identifying how many MDUs are currently located in each volume. In some embodiments, the congestion management engine 103 may identify volumes that have a number of MDUs currently located within the area associated with the volume as a "highly dense volume" when the number of MDUs currently located within the area associated with the volume exceeds a threshold number of MDUs (e.g., 3, 4, 7, 10, etc.).

For each of the volumes identified as being a "highly dense volume," the congestion management engine 103 may be configured to calculate density values 314, each corresponding to the highly dense volume (e.g., highly dense volume 1), and each density value corresponding to navigational data associated with a historical time period (e.g., one of time periods T1-T4).

In some embodiments, the congestion management engine 103 may be configured to identify congestion that may occur within the workspace at a future time. In these embodiments, the congestion management engine 103 may utilize planned path data associated with each of the MDUs 104 to identify a future location of each MDU within the workspace (e.g., where each MDU will be located 10 seconds from a current time). In some embodiments, the congestion management engine 103 may ignore or otherwise filter MDUs that are determined (e.g., from corresponding planned path data) to be in an idle and/or stationed state during the future time period (e.g., T5). The locations of the MDUs at the future time may be mapped to a corresponding location of the grid, the corresponding location being associated with one or more volumes of the grid 304. The congestion management engine 103 may calculate a density value for each of the volumes of the grid 304 by identifying how many MDUs are to be located in each volume at the future time. In some embodiments, the congestion management engine 103 may identify volumes as being "highly dense" when the number of MDUs to be located within the area associated with the volume at a future time exceeds a threshold number of MDUs (e.g., 3, 4, 7, 10, etc.).

For each of the volumes identified as being a "highly dense volume," the congestion management engine 103 may be configured to calculate density values 316, each corresponding to the highly dense volume (e.g., highly dense volume 1), and each density value corresponding to planned path data associated with a variety of future time periods (e.g., one of time periods T6-T8).

At 318, a number of congested volumes may be identified based at least in part on the density values calculated at 312. For example, should the congestion management engine 103 be performing operations to determine congestion that has already occurred in the workspace, the congestion management engine 103 may utilize density values 314 and a predefined protocol set defining a number of rules to be utilized to identify a congested volume using density values corresponding to one or more historical time periods. In some embodiments, the protocol set may specify that a volume may be determined to be a congested volume, when the volume has density values that exceed a threshold number of MDUs, over a threshold number of times (H) based at least in part on the last N density values, where H and N may be whole numbers. The threshold number of MDUs (e.g., 3, 4, 7, 10, 8, etc.) may be predetermined and/or adjustable. In some embodiments, the values of H and N may also be predetermined and/or adjustable. In some embodiments, the protocol set may further specify that a volume may be determined to not be congested when the volume has density values that exceed a threshold number of MDUs, less than a lower threshold number of times (L) based at least in part on the last N density values, where L may be a whole number. The value L may be predetermined and/or adjustable. In some embodiments, the protocol set may further specify that if a volume is associated with density values indicating a number that exceeds the threshold number of MDUs more than L instances but less than H times, the volume may be identified to be congested when a density value corresponding to a most recent historical time period (e.g., T1) exceeds the threshold number of MDUs.

In some embodiments, in which the congestion management engine 103 is performing operating to identify future congestion, the congestion management engine 103 may be configured to utilize density values 316 and a predefined protocol set to identify a congested volume using density values corresponding to one or more future time periods. Similar to the example provided above, the protocol set may specify that a volume may be determined to be a congested volume when the volume has density values that exceed a threshold number of MDUs, over a threshold number of times (H) based at least in part on N density values (e.g., density values 316), where H and N may be whole numbers. In some embodiments, the protocol set may further specify that a volume may be determined to not be congested when the volume has density values (e.g., density values 316) that exceed a threshold number of MDUs, less than a lower threshold number of times (L) based at least in part on the last N density values. In some embodiments, the protocol set may further specify that if a volume is associated with density values (e.g., density values 316) indicating a number that exceeds the threshold number of MDUs more than L instances but less than H times, the volume may be identified to be congested when a density value corresponding to a latest future time period (e.g., T8) (or, in some cases, an earliest future period T5) exceeds the threshold number of MDUs.

At 320, the congestion management engine 103 may generate supplemental data 322 for each of the identified congested volumes (e.g., pertaining to historic congestion and/or future congestion depending on the particular use case). For example, the congestion management engine may identify particular MDU identifiers corresponding the MDUs that have been (or are planned to be) within the congested volume at least some threshold number of instances based at least in part on the last I instances of historic navigational data (or planned path data), where I is a whole number and may be predefined. As another example, the supplemental data may include a respective speed (or planned speed) of each MDU within the congested volume over a particular historic time period and/or an average speed (or an average of the planned speeds) of the MDUs within the congested volume over the particular historic (or future) time period. In some embodiments, the supplemental data may be associated with a volume identifier and these associations stored for subsequent processing by any suitable module of the system (a path planning module of the management module 102 of FIG. 1). It should be appreciated that data processing efforts may be reduced by calculating such supplemental data only for identified congested volumes rather than for every volume in the grid. The supplemental data may be stored in any suitable storage location (e.g., an in-process cache, a data store, etc.) that is configured to store such information. In some embodiments, the congestion management engine may be configured to push an identifier of a congested volume and corresponding supplemental data to another system (e.g., a path planning module of the management module) for further processing.

At 324, the congestion management engine 103 may perform at least one remedial action based at least in part on the supplemental congestion data generated at 320. By way of example, the remedial action performed may include any suitable combination of providing a notification indicating the congestion, causing modification of at least one planned path corresponding to at least one of the MDUs of the workspace, causing a task assignment corresponding to at least one of the MDUs of the workspace to be cancelled and/or reassigned, or causing at least one path to be generated for an MDU of the workspace based at least in part on the supplemental data generated at 320. As a non-limiting example, once a congested volume 326 is identified (e.g., via historic navigation data and/or planned path data), a planned path 328 of MDU 104-2 may be modified to planned path 330 so as to avoid the area corresponding to congested volume 326.

It should be appreciated that the method 300 may be performed any suitable number of times. As time goes by, more navigational data may be obtained from the MDUs and/or the planned paths may be further executed, thus the density values (of historical time periods and/or future time periods) may be computed for different time periods with respect to a current time. It should be appreciated that once a congested volume has been identified and at least one remedial action performed based at least in part on the supplemental data generated for the congested volume, the congestion management engine 103 may be configured to forgo future calculations associated with the congested volume. By way of example, once a congested volume is identified, if it is identified as being highly dense during within a subsequent time period, the congestion management engine 103 may be configured to forgo operations corresponding to the protocol set for determining whether the volume is congested. In some cases, the congestion management engine 103 may further forgo generating new supplemental data for the congested volume. Accordingly, the congestion management engine 103 may not perform duplicate congestion processing for volumes that have previously been identified as congested and which are again determined to be highly dense. If, however, the congestion management engine 103 at a later time determines that the volume is no longer highly dense, congestion processing may once again occur upon a subsequent determination that the volume is higher dense.

Figure 4:
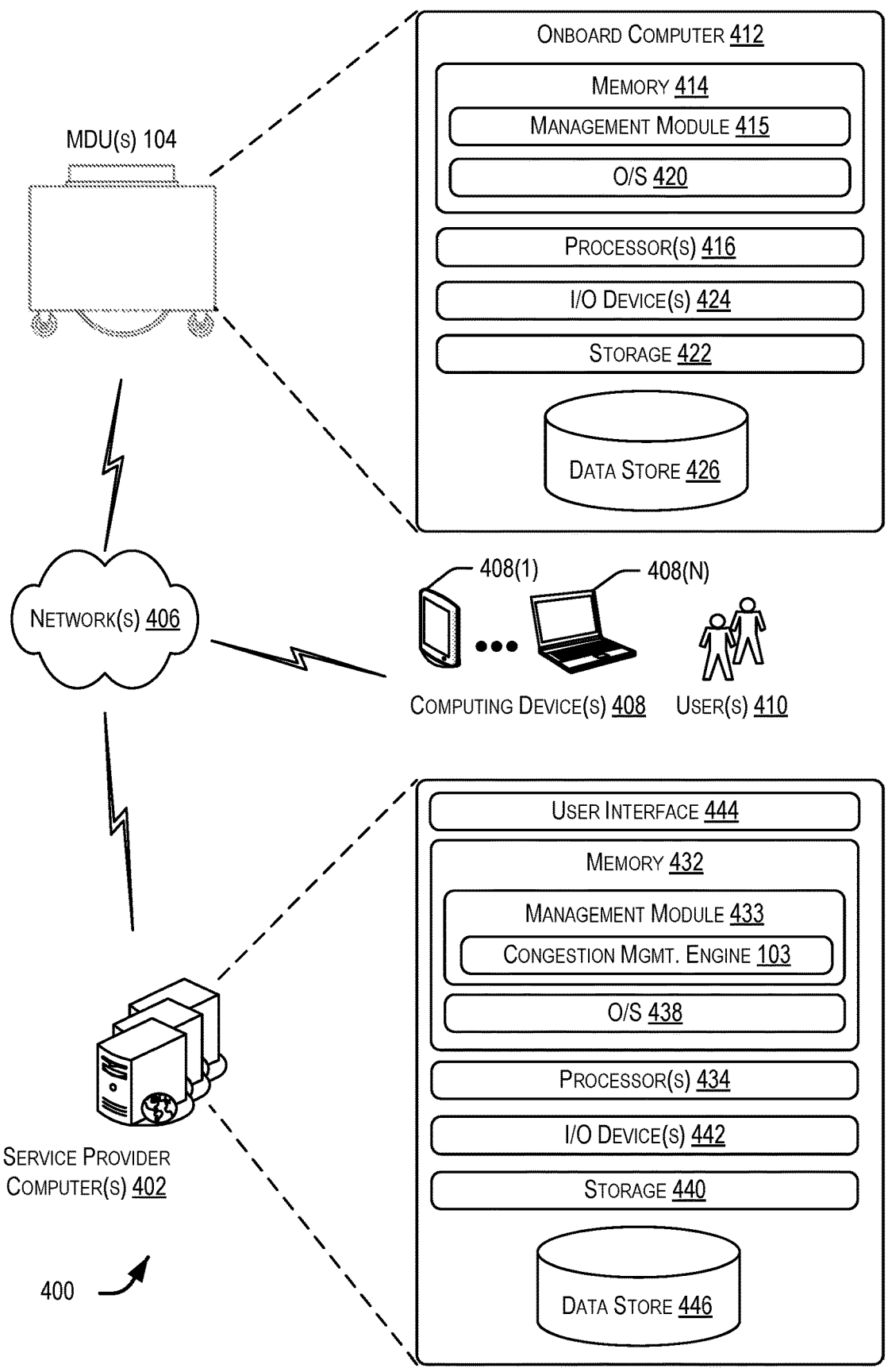
FIG. 4 is an example system architecture for implementing aspect of an inventory system, in accordance with at least one embodiment.

FIG. 4 is an example system architecture for implementing aspects of an inventory system 400, in accordance with at least one embodiment. The architecture of the inventory system 400 may include a service provider computer(s) 402. The service provider computer(s) 402 may support an electronic marketplace (not shown) and interface with purchase and delivery services of the electronic marketplace. In this manner, the service provider computer(s) 402 may coordinate receiving, storing, packaging, shipping, and/or sorting of items in a workspace (e.g., workspace 106 of FIG. 1) operated by, or on behalf of, the electronic marketplace provider. In some examples, the service provider computer(s) 402 may be a stand-alone service operated on its own or in connection with an electronic marketplace. In either example, the service provider computer(s) 402 may be in communication with the mobile drive units 104 via one or more network(s) 406 (hereinafter, "the network 406"). The network 406 may include any one or a combination of many different types of networks, such as cable networks, the Internet, wireless networks, cellular networks, radio networks, and other private and/or public networks.

Computing devices 408(1)-408(N) (hereinafter, "the computing device(s) 408") may also be in communication with the service provider computer(s) 402 via the network 406. The computing device(s) 408 may be operable by one or more user(s) 410 (hereinafter, "the users 410") to access the service provider computer(s) 402 via the network 406. The computing device(s) 408 may be any suitable device capable of communicating with the network 406. For example, the computing device(s) 408 may be any suitable computing device such as, but not limited to, a mobile phone, a smart phone, a personal digital assistant (PDA), a laptop computer, a thin-client device, a tablet PC, a desktop computer, a set-top box, or other computing device. The computing device(s) 408 may include similar components provided in the onboard computer 412, including one or more processors, memory, I/O devices, one or more data stores, additional storage, an operating system, and, in particular embodiments, a management module similar to the management module 415. In some embodiments, the computing device(s) 408 may be utilized to interact with an electronic marketplace (e.g., an electronic marketplace hosted by the service provider computer(s) 402). In some embodiments, the computing device(s) 408 may be operated by one or more individuals working with a workspace (e.g., the workspace 106). The functionality provided by the management module 415 discussed below with respect to the mobile drive unit(s) (MDU(s)) 104 may similar be provided by a management module operating on a computing device(s) 408. Likewise, the functionality of management module 433 provided to the MDU(s) 104 may similarly be provided by the computing device(s) 408.

Turning now to the details of the MDU(s) 104, the MDU(s) 104 may include an onboard computer 412 including at least one memory 414 and one or more processing units (or processor(s)) 416. The processor(s) 416 may be implemented as appropriate in hardware, computer-executable instructions, software, firmware, or combinations thereof. Computer-executable instruction, software or firmware implementations of the processor(s) 416 may include computer-executable or machine-executable instructions written in any suitable programming language to perform the various functions described. The memory 414 may include more than one memory and may be distributed throughout the onboard computer. The memory 414 may store program instructions (e.g., program instructions of the management module 415) that are loadable and executable on the processor(s) 416, as well as data generated during the execution of these programs. In some embodiments, the management module 415 may comprise code, that, when executed by the processor(s) 416 cause the MDU(s) 104 to collect and transmit navigational information at any suitable time, at a set frequency (e.g., every 10 seconds), periodically, upon reading a fiducial marker (e.g., the fiducial markers 114 of FIG. 1), or at any suitable time, or in response to any suitable stimulus.

Depending on the configuration and type of memory including the management module 415, the memory 414 may be volatile (such as random access memory (RAM)) and/or non-volatile (such as read-only memory (ROM), flash memory, or other memory). The memory 414 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 414 may include multiple different types of memory, such as static random access memory (SRAM), dynamic random access memory (DRAM), or ROM. Turning to the contents of the memory 414 in more detail, the memory 414 may include an operating system 420 and one or more application programs, modules or services for implementing the features disclosed herein including at least the management module 415.

In some examples, the onboard computer may also include additional storage 422, which may include removable storage and/or non-removable storage. The additional storage 422 may include, but is not limited to, magnetic storage, optical disks, and/or tape storage. The disk drives and their associated computer-readable media may provide non-volatile storage of computer-readable instructions, data structures, program modules, and other data for the computing devices.

The memory 414 and the additional storage 422, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer 412. The modules of the onboard computer 412 may include one or more components. The onboard computer 412 may also include input/output (I/O) device(s) 424 and/or ports, such as for enabling connection with a keyboard, a mouse, a pen, a voice input device, a touch input device, a display, speakers, a printer, or other I/O device. The I/O device(s) 424 may enable communication with the other systems of the MDU(s) 104 (e.g., navigation systems (not depicted), drive controllers (not depicted), etc.).

The onboard computer 412 may also include data store 426. The data store 426 may include one or more databases, data structures, or the like for storing and/or retaining information associated with the MDU(s) 104.

Turning now to the details of the computing device(s) 408. The computing device(s) 408 may be used by the user(s) 410 for interacting with the service provider computer(s) 402. The computing device(s) 408 may therefore include a memory, a processor, a user-interface, a web-service application, and any other suitable feature to enable communication with the features of architecture of FIG. 4. The web service application may be in the form of a web browser, an application programming interface (API), virtual computing instance, or other suitable application. In some examples, when the service provider computer(s) 402 are part of, or share an association with, an electronic marketplace, the computing device(s) 408 may be used by the user(s) 410 for procuring one or more items from the electronic marketplace. As discussed above, in some embodiments, the computing device(s) 408 may be operated by one or more individuals working with a workspace (e.g., the environment 100 of FIG. 1).

The service provider computer(s) 402, perhaps arranged in a cluster of servers or as a server farm, may host web service applications. These servers may be configured to host a website (or combination of websites) viewable via the computing device(s) 408. In at least one example, the service provider computer(s) 402 may be configured to manage the MDU(s) 104 as part of an inventory system (e.g., the environment 100 of FIG. 1) and/or the service provider computer(s) 402 may be configured to manage a number of individuals within the inventory system via the computing device(s) 408. The service provider computer(s) 402 may include at least one memory 432 and one or more processing units (or processor(s)) 434. The processor(s) 434 may be implemented as appropriate in hardware, computer-executable instructions, software, firmware, or combinations thereof. Computer-executable instruction, software or firmware implementations of the processor(s) 434 may include computer-executable or machine-executable instructions written in any suitable programming language to perform the various functions described.

The memory 432 may include more than one memory and may be distributed throughout the service provider computer(s) 402. The memory 432 may store program instructions (e.g., management module 433) that are loadable and executable on the processor(s) 434, as well as data generated during the execution of these programs. In some embodiments, congestion management engine 103 may operate as part of the management module 433. It should be appreciated that the congestion management engine 103 may operate as a standalone module separate from the management module 433. Depending on the configuration and type of memory including the management module 433, the memory 432 may be volatile (such as random access memory (RAM)) and/or non-volatile (such as read-only memory (ROM), flash memory, or other memory). The service provider computer(s) 402 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 432 may include multiple different types of memory, such as static random access memory (SRAM), dynamic random access memory (DRAM), or ROM.

Turning to the contents of the memory 432 in more detail, the memory 432 may include an operating system 438 and one or more application programs, modules or services for implementing the features disclosed herein including at least the management module 433. The management module 433, in some examples, may function similarly to the management module 415 with respect to determining tasks for the MDU(s) 104, determining a set of action to perform to execute the task, identifying paths for the MDU(s) 104 to be utilized for performance of their respective assigned tasks, etc. For example, when the MDU(s) 104 are in network communication with the service provider computer(s) 402, the MDU(s) 104 may receive at least some instructions from the service provider computer(s) 402 (e.g., from the management module 436). In some examples, the MDU(s) 104 may execute any suitable portion of the management module 433 to operate independent of the service provider computer(s) 402.

In some examples, the service provider computer(s) 402 may also include additional storage 440, which may include removable storage and/or non-removable storage. The additional storage 440 may include, but is not limited to, magnetic storage, optical disks, and/or tape storage. The disk drives and their associated computer-readable media may provide non-volatile storage of computer-readable instructions, data structures, program modules, and other data for the computing devices.

The memory 432 and the additional storage 440, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computer(s) 402. The modules of the service provider computer(s) 402 may include one or more components. The service provider computer(s) 402 may also include input/output (I/O) device(s) 442 and/or ports, such as for enabling connection with a keyboard, a mouse, a pen, a voice input device, a touch input device, a display, speakers, a printer, or other I/O device.

In some examples, the service provider computer(s) 402 may include a user interface 444. The user interface 444 may be utilized by an operator, or other authorized user to access portions of the service provider computer(s) 402. In some examples, the user interface 444 may include a graphical user interface, web-based applications, programmatic interfaces such as application programming interfaces (APIs), or other user interface configurations. The service provider computer(s) 402 may also include data store 446. The data store 446 may include one or more databases, data structures, or the like for storing and/or retaining information associated with the service provider computer(s) 402. In some examples, the service provider computer(s) 402 may store a larger amount of information in the data store 446 than the onboard computer 412 is capable of storing in the data store 426. Thus, in some examples, at least a portion of the information from the databases in the data store 446 (e.g., navigation data) may be provided to the databases of the data store 426, e.g., periodically, occasionally, in connection with an event, or otherwise.

In at least one embodiment, the management module 415 and/or the management module 433 (hereinafter, the "management modules") may provide the functionality of the management module 102 of FIG. 1. The congestion management engine 103 may provide the functionality discussed above in connection with FIG. 1-3 as a standalone module or as part of the management module 433 and/or management module 415.

Figure 5:
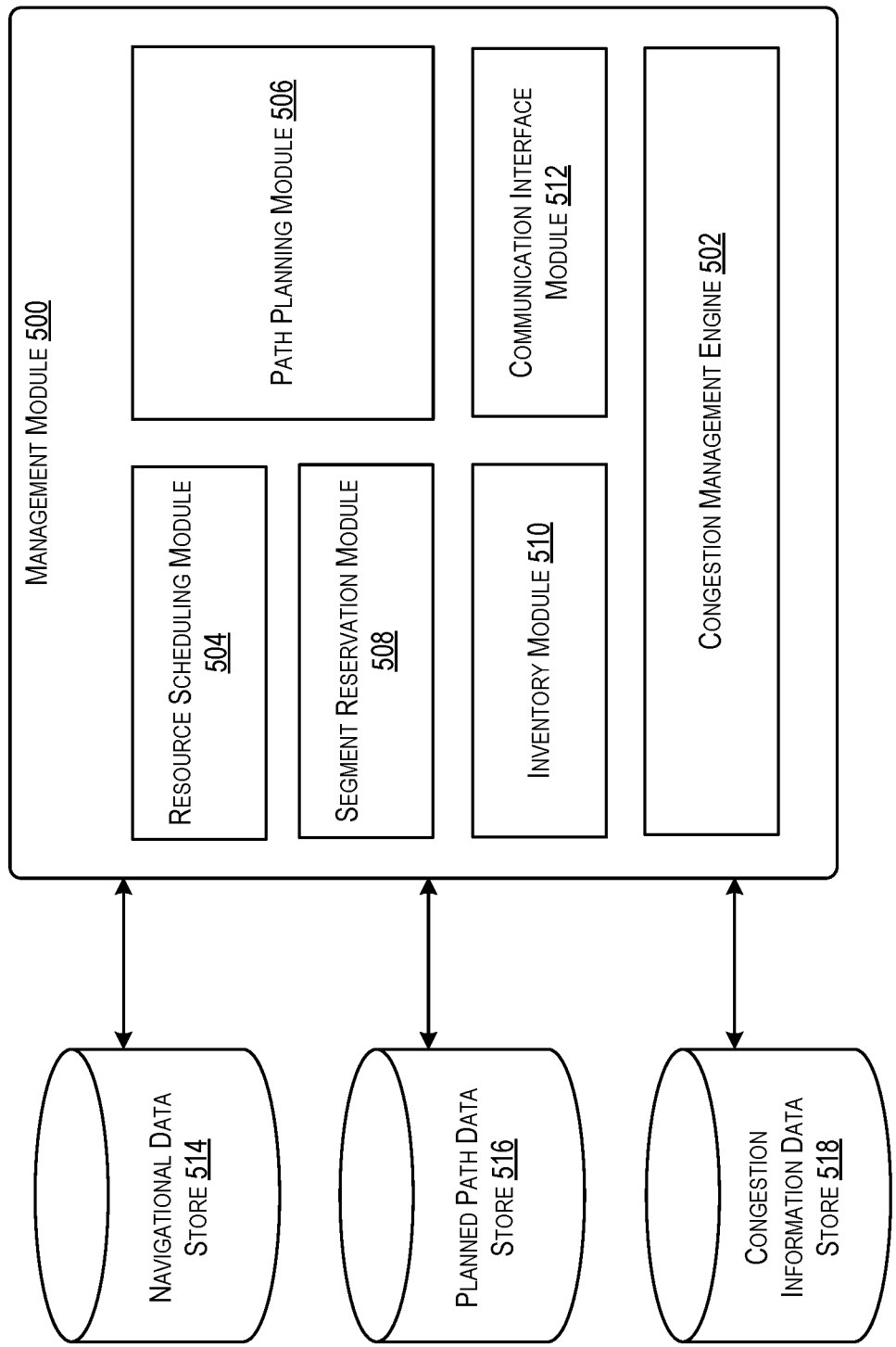
FIG. 5 illustrates in greater detail the components of an example management module, including a congestion management engine that may be utilized in at least one embodiment.

FIG. 5 illustrates in greater detail the components of an example management module 500 (e.g., the management module 102 of FIG. 1, the management modules 415/433 of FIG. 4), including a congestion management engine 502 (e.g., the congestion management engine 103 of FIGS. 1-4), that may be utilized in at least one embodiment. As shown, the example embodiment includes a resource scheduling module 504, a path planning module 506, a segment reservation module 508, an inventory module 510, a communication interface module 512, and the congestion management engine 502. As discussed above, the management module 500 may represent a single component, multiple components located at a central location within inventory system (e.g., the service provider computer(s) 402 of FIG. 4), or multiple components distributed throughout inventory system. For example, management module 500 may represent components of one or more of MDU(s) 104 of FIGS. 1, 2, and 4 that are capable of communicating information between the MDU(s) 104 and coordinating the movement of the MDU(s) 104 within a workspace (e.g., the workspace 106 of FIG. 1). In general, the management module 500 may include any appropriate combination of hardware and/or software suitable to provide the described functionality. It should be appreciated that while the congestion management engine 502 is depicted in FIG. 5 as part of the management module 500, the congestion management engine 502 may execute as a process and/or module separate from, but in communication with, the management module 500. By way of example, the congestion management engine 502 may operate as a standalone module configured to communicate with any suitable combination of the management module 500, the navigational data store 514, the planned path data store 516, and/or the congestion information data store 518.

In at least one embodiment, the resource scheduling module 504 may be configured to process received inventory requests and generate one or more assigned tasks to be completed by the components of the inventory system 400. The resource scheduling module 504 may also select one or more appropriate components for completing the assigned tasks and may communicate, via the communication interface module 512, the assigned tasks to the relevant components. In some examples, the resource scheduling module 504 may select the one or more appropriate components (e.g., MDUs) based on a location of the MDU (e.g., as determined by utilizing fiducial markers 114 of FIG. 1, by utilizing images/videos of the workspace 106 and image recognition techniques, by utilizing global positioning system devices of the MDU(s) 104, or by any suitable method). Additionally, the resource scheduling module 504 may also be responsible for generating assigned tasks associated with various management operations, such as prompting MDU(s) 104 to recharge batteries or have batteries replaced, instructing inactive MDU(s) 104 to park in a location outside the anticipated traffic flow or a location near the anticipated site of future tasks, and/or directing the MDU(s) 104 selected for repair or maintenance to move towards a designated maintenance station. Additionally, the resource scheduling module 504 may also be responsible for assigning tasks and/or updating previously-assigned tasks in response to data (e.g., congestion information, supplemental information, etc.) provided and/or generated by the congestion management engine 103.

In at least one embodiment, the path planning module 506 may receive route requests from the MDU(s) 104. These route requests may identify one or more destinations associated with a task the requesting mobile drive unit is executing. In response to receiving a route request, the path planning module 506 may generate a path to one or more destinations identified in the route request. The path planning module 506 may implement any appropriate algorithms utilizing any appropriate parameters, factors, and/or considerations to determine the appropriate path. After generating an appropriate path, the path planning module 506 may transmit a route response identifying the generated path to the requesting MDU using the communication interface module 512.

In at least one embodiment, the segment reservation module 508 may receive reservation requests from the MDU(s) 104 attempting to move along paths generated by the path planning module 506. These reservation requests may indicate a request for the use of a particular portion of the workspace 106 (referred to herein as a "segment") to allow the requesting mobile drive unit to avoid collisions with other MDU(s) 104 while moving across the reserved segment. In response to received reservation requests, segment reservation module 508 may transmit a reservation response granting or denying the reservation request to the requesting mobile drive unit using the communication interface module 512.

In at least one embodiment, the inventory module 510 may maintain information about the location and number of inventory items in the inventory system 400. Information can be maintained about the inventory items in a particular receptacle (e.g., a receptacle 112 of FIG. 1), and the maintained information can include the location of those inventory items within the receptacle (e.g., within a sub-area of a storage container, within a bin, tote, etc.). The inventory module 510 can also communicate with the MDU(s) 104, utilizing task assignments 18 of FIG. 1 to maintain, replenish or move inventory items within the inventory system 400.

In at least one embodiment, the communication interface module 512 may facilitate communication between management module 500 and other components of inventory system 400, including reservation responses, reservation requests, route requests, route responses, and task assignments. These reservation responses, reservation requests, route requests, route responses, and task assignments may represent communication of any form appropriate based on the capabilities of management module 500 and may include any suitable information. Depending on the configuration of management module 500, communication interface module 512 may be responsible for facilitating either or both of wired and wireless communication between management module 500 and the various components of inventory system 400. In particular embodiments, management module 500 may communicate using communication protocols such as 802.11, Bluetooth, or Infrared Data Association (IrDA) standards. Furthermore, management module 500 may, in particular embodiments, represent a portion of mobile drive unit or another component of inventory system 400. In such embodiments, communication interface module 512 may facilitate communication between management module 500 and other parts of the same system component.

In at least one embodiment, the congestion management engine 502 may be configured to generate a grid of volumes associated with a workspace. An electronic representation of the workspace may be maintained by the congestion management engine 502. In some embodiments, the congestion management engine 502 may obtain/retrieve a previously generated electronic representation from any suitable storage location. The electronic representation of the workspace may be in any form. As non-liming examples, the electronic representation may include a graphical map and/or a list of sub-areas and corresponding attributes (e.g., relative location within the workspace, a location identifier, dimensions of the sub-area, etc.).

As described above in connection with FIG. 2, the congestion management engine 502 may generate a grid including one or more sets of volumes. One set of volumes may include any suitable number of vertical volumes, while another set of volumes may include any suitable number of horizontal volumes. In some embodiments, the congestion management engine 502 may generate the set(s) of volumes to overlap one another and/or to overlap other sets of volumes of the grid. That is, a vertical set of volumes may be generated to overlap other vertical volumes and/or horizontal volumes and a horizontal set of volumes may be generated to overlap other horizontal volumes and/or vertical volumes. The size and/or dimensions of the vertical and/or horizontal volumes and/or the amount of overlap between vertical and/or horizontal volumes may be predetermined and/or identified based at least in part on optimizing between achieving a degree of congestion detection accuracy and an amount of processing resources required for performing the operations needed to achieve that accuracy. The grid of vertical and/or horizontal volumes may be generated to cover an entire area of the workspace.

In some embodiments, the congestion management engine 502 may be configured obtain navigational data (e.g., from the navigational data store 514). The navigational data may correspond to one or more components (e.g., MDUs, user computing devices, etc.) of the workspace and may have been initially provided to any suitable module of the management module 500 and stored in the navigational data store 514. Alternatively, the congestion management engine 502 may request navigational data for the components of the workspace from any suitable module of the management module 500. The congestion management engine 502 may utilize the navigational data to identify a current location (and/or other attributes such as current speed, current state, etc.) for each of the components within the workspace. In some embodiments, the congestion management engine 502 may be configured to filter components that are determined to be in an idle and/or stationed state before further processing is performed.

The congestion management engine 502 may utilize the current locations of the various components of the workspace and the electronic representation or the grid of volumes to map the current locations to locations corresponding to one or more volumes of the grid. Once mapped, the congestion management engine 502 may calculate a density value for each volume of the grid. In some embodiments, the density value may quantify a number of MDUs that are located within a given volume. The congestion management engine 502 may be configured to determine that one or more of the volumes are "highly dense volumes" based at least in part on determining that the number of MDUs within a volume exceeds a threshold value. A list of volume identifiers corresponding to the highly dense volumes may be stored in the congestion information data store 518.

In some embodiments, the congestion management engine 502 may be configured to obtain, for each highly dense volume determined, a number of instances of navigational data corresponding to a predetermined number of historical time periods (e.g., the last 5 instances of navigational data, each instance corresponding to a 1 second time period, a 500 millisecond time period, or the like). The specific number of instances of navigational data obtained (e.g., the last 5 instances of navigation data, the last 20 instances of navigational data, etc.) may be according to a predetermined rule of the protocol set and/or adjustable. The historical time periods may correspond to a duration (e.g., 2 seconds, 500 milliseconds, 10 seconds, etc.) that is predetermined and/or adjustable. These instances of navigational data may be obtained, for example, from the navigational data store 514. The congestion management engine 502 may be configured to generate a corresponding density value for each instance of navigational data. The congestion management engine 502 may be configured to implement a protocol set that includes a number of rules identifying when a volume is to be determined to be congested.

By way of example, the congestion management engine 502 may determine, from the number of instances of navigational data corresponding to a highly dense volume, a number of time periods during which a density value exceeded a threshold value. Said another way, the congestion management engine 502 may determine how many times corresponding to the historical time periods that a particular volume was identifiable as being highly dense. In accordance with the protocol set, the congestion management engine 502 may be configured to classify a highly dense volume as being congested when the number of time periods during which a density value exceeded a threshold value (e.g., 3 MDUs, 4 MDUs, etc.) occurred over an upper threshold value (H) (e.g., 5 times, 8 times, etc.). Also in accordance with the protocol set, the congestion management engine 502 may be configured to classify a highly dense volume as not being congested when the number of time periods during which a density value exceeded a threshold value occurred less than or equal to a lower threshold value (L). In some embodiments, when the number of time periods during which a density value exceeded a threshold value exceeds the lower threshold value, but fell short of the upper threshold value, the congestion management engine 502, in accordance with the protocol set, may be configured to identify the volume as being congested only if a current density value and a density value corresponding to a most-recent historical time period both exceed a threshold value (e.g., 3 MDUs, 4 MDUs, etc.). The congestion management engine 502 may store (e.g., within the congestion information data store 518) volume identifiers associated with the volumes identified as congested volumes.

In some embodiments, the congestion management engine 502 may be configured to determine congested volumes from planned path data obtained from the planned path data store 516. In some embodiments, an instance of planned path data may specify a planned path of travel through the workspace for a particular component. In some embodiments, the congestion management engine 502 may utilize a portion of the planned path data corresponding to a single future time period (e.g., the next 10 seconds of each path of each component), or the congestion management engine 502 may utilize multiple portions of the planned path data corresponding to multiple future time periods. Utilizing the planned path data corresponding to each component, the congestion management engine 502 may determine how many times corresponding to the future time period(s) that a particular volume was identifiable as being highly dense.

In accordance with the protocol set, the congestion management engine 502 may be configured to classify volume as a congested when the number of future time periods during which a density value exceeded a threshold value (e.g., 3 MDUs, 4 MDUs, etc.) occurred over an upper threshold value (H) (e.g., 5 times, 8 times, etc.). In embodiments in which the congestion management engine 502 is utilizing planned path data of a single future time period, any occurrence of a "highly dense volume" (e.g., a density value that exceeds the threshold value) may cause the congestion management engine 502 to classify the volume as a congested volume. For embodiments in which planned path data for multiple future time periods is utilized, the congestion management engine 502 may be configured to classify a volume as not being congested when the number of future time periods during which a corresponding density value exceeded a threshold value occurred less than or equal to a lower threshold value (L). In some embodiments, the number of future time periods during which a corresponding density value exceeded a threshold value may exceed the lower threshold value, but fall short of the upper threshold value. In these examples, the congestion management engine 502, in accordance with the protocol set, may be configured to identify the volume as being congested only if a current density value and a density value corresponding to a earliest future time period (e.g., a time period closest to a current time) both exceed a threshold value (e.g., 3 MDUs, 4 MDUs, etc.). The congestion management engine 502 may store (e.g., within the congestion information data store 518) volume identifiers associated with the volumes identified as congested volumes.

It should be appreciated that the congestion management engine 502 may, in some embodiments, utilize any suitable combination of historical navigational data and/or planned path data to identify one or more congested volumes. For example, the protocol set may specify that a volume may be determined to be congested when the historical navigational data corresponding to a last X historical time periods and planned path data corresponding to the next Y future time periods indicate density values that are each over a threshold value.

In some embodiments, the congestion management engine 502 may be configured to generate supplemental data associated with any suitable number of congested volumes (e.g., congested volumes identified based at least in part on historical navigational data and/or planned path data). In some embodiments, the supplemental data may be generated from any suitable combination of navigational data and/or planned path data corresponding to the components located within an area associated with the volume. In some embodiments, components that are determined (e.g., from the navigational data) to be idle and/or stationed within the volume may be disregarded and no supplemental data may be generated for those components. As a non-limiting example, the congestion management engine 502 may generate supplemental data for a volume corresponding to a number of identifiers that correspond to the components located within the area associated with the volume, respective speeds of the components within the volume, an average speed of the components within the volume, a number of identifiers corresponding to components that have been located within an area associated with the volume for at least N number of the previous historical time periods, and the like. The congestion management engine 502 may store the supplemental data of a volume as an association with a corresponding volume identifier within the congestion information data store 518 and/or the congestion management engine 502 may be configured to provide congested volume identifiers and corresponding supplemental data to any module of the management module 500.

In some embodiments, by providing and/or storing the congested volume identifiers the congestion management engine 502 may cause one or more remedial actions to be performed (e.g., by the congestion management engine 502, by any suitable module of the management module 500, by any suitable combination of the modules of the management module 500, etc.). By way of example, the one or more remedial actions may include any suitable combination of modifying a path of one or more of the components within the congested volume, modifying a task assignment associated with one or more components within the congested volume, modifying a previously determined path associated with one or more components that are not currently located in the congested volume (e.g., components that, based at least in part on planned path data, were originally planning to travel through the congested volume), generating a path for a component while ensuring that the path generated avoids congested volumes, providing a notification indicating the congested volumes, and the like.

It should be appreciated that, as new historical data is collected and/or subsequent path portions are executed the congestion management engine 502 may be configured to ignore previously identified congested volumes. That is, the congestion management engine 502, upon identifying that a previously identified congested volume is once again highly dense (or will again be highly dense in the near future), the congestion management engine 502 may perform no further operations with respect to generating density value calculations and/or supplemental data generation for the volumes already determined to be congested. At a subsequent time, the congestion management engine 502 may determine that a previously congested volume has become uncongested. After this determination is made, should the congestion management engine 502 subsequently determine that the volume is highly dense, the congestion management engine 502 may proceed with congested detection and/or performance of one or more remedial actions as described above.

In general, the resource scheduling module 504, the path planning module 506, the segment reservation module 508, the inventory module 510, the communication interface module 512, and the congestion management engine 502, may each represent any appropriate hardware and/or software suitable to provide the described functionality. In addition, as noted above, management module 500 may, in particular embodiments, represent multiple different discrete components and any or all of the resource scheduling module 504, the path planning module 506, the segment reservation module 508, the inventory module 510, the communication interface module 512, and the congestion management engine 502 may represent components physically separate from the remaining elements of management module 500. Moreover, any two or more of the resource scheduling module 504, the path planning module 506, the segment reservation module 508, the inventory module 510, the communication interface module 512, and/or the congestion management engine 502 may share common components.

Figure 6:
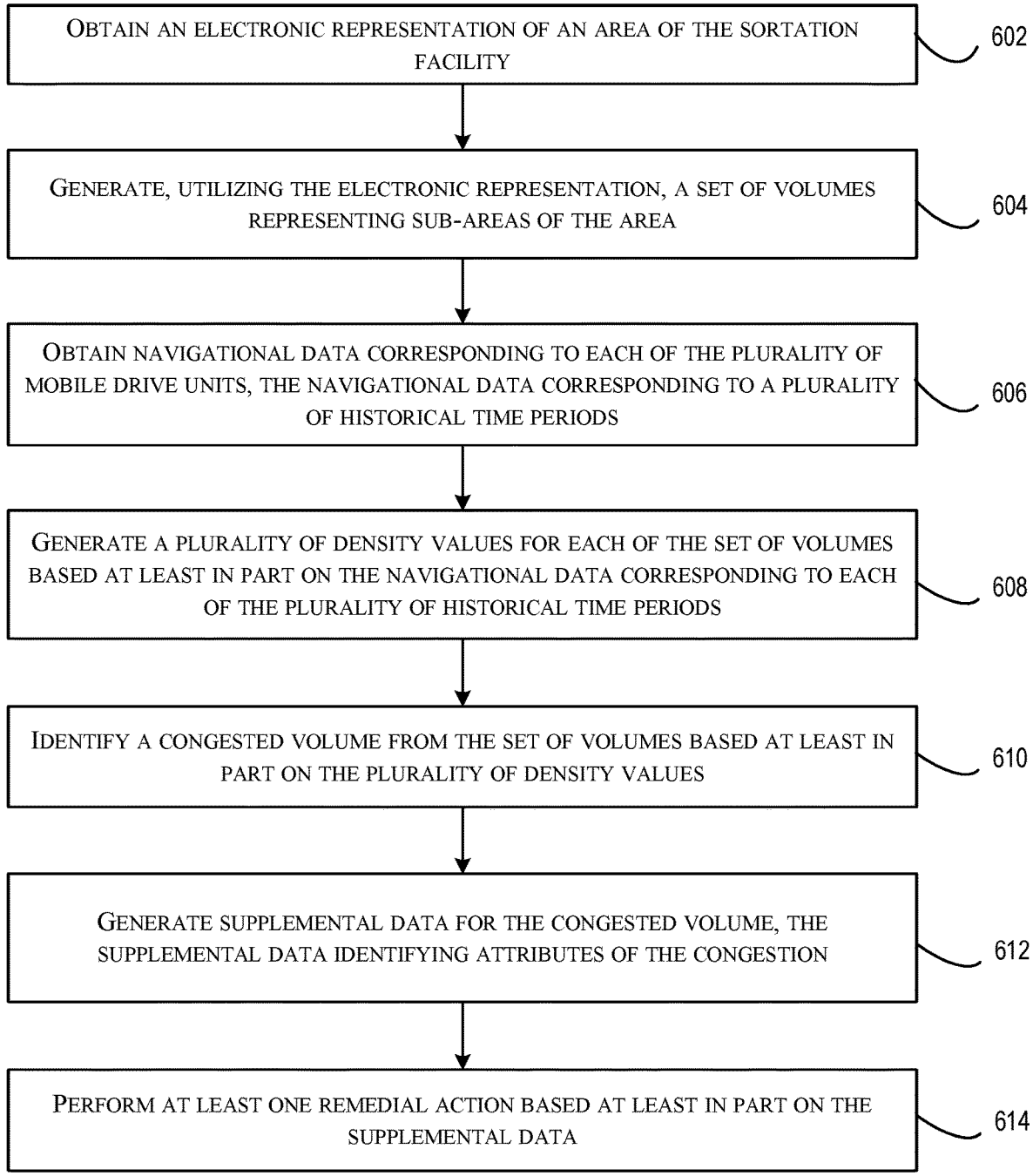
FIG. 6 is a flowchart illustrating an example method for performing one or more remedial actions with respect to detecting congestion within a workspace, in accordance with at least one embodiment.

FIG. 6 is a flowchart illustrating an example method 600 for performing one or more remedial actions with respect to detecting congestion within a workspace, in accordance with at least one embodiment. The method may be performed by a system (e.g., the inventory system 400 of FIG. 4) comprising a plurality of mobile drive units located within a facility (e.g., a sortation facility, a storage facility, etc.) and individually configured to move items within the facility, one or more data networks, one or more processors and one or more memories storing computer-readable instructions that, upon execution by the one or more processors, cause the inventory system to at least to perform the operations of method 600. It should be appreciated that the system may alternatively include a plurality of user computing devices located within the facility and that the method 600 may similarly be applied in these use cases.

The method may begin at block 602, where an electronic representation (e.g., a map) of an area of the sortation facility (e.g., the workspace 106 of FIG. 1) may be obtained. In some embodiments, a congestion management module (e.g., the congestion management engine 502 of FIG. 5) may obtain the electronic representation from any suitable storage location (e.g., the navigational data store 514 of FIG. 5).

At 604, utilizing the electronic representation, a set of volumes representing sub-areas of the area may be generated (e.g., by the congestion management engine 502). In some embodiments, the set of volumes may include any suitable number of vertical volumes and/or any suitable number of horizontal volumes. Further aspects of these volumes are discussed in more detail above, with respect to FIG. 2.

At 606, navigational data corresponding to each of the plurality of mobile drive units may be obtained. In some embodiments, the navigational data may correspond to a plurality of historical time periods. The particular number of historical time periods utilized may be predetermined and/or adjustable. In some embodiments, the particular number of historical time periods utilized may be optimized with respect to maximizing a degree of accuracy of congestion detection while minimizing the processing burden for achieving that degree of accuracy.

At 608, a plurality of density values for each of the set of volumes may be generated based at least in part on the navigational data corresponding to each of the plurality of historical time periods.

At 610, a congested volume may be identified from the set of volumes based at least in part on the plurality of density values. In some embodiments, the congested volume may be identified from highly dense volumes (e.g., volumes having a density value over a threshold value) of the set of volumes. The specific protocol set utilized to identify (classify) a volume as a congested volume may vary. Some examples of a protocol set are discussed above in connection with FIGS. 3 and 5.

At 612, supplemental data may be generated for the congested volume. In some embodiments, the supplemental data may identify attributes of the congestion. In some embodiments, the supplemental data for a volume may correspond to a number of identifiers that correspond to the MDUs located within an area associated with the volume, respective speeds of the MDUs within the volume, an average speed of the MDUs within the volume, a number of identifiers corresponding to components that have been located within an area associated with the volume for at least N number of the previous historical time periods, and the like.

At 614, at least one remedial action may be performed based at least in part on the supplemental data. By way of example, a remedial action may include any suitable combination of modifying a path of one or more of the MDUs within an area associated with the congested volume, modifying a task assignment associated with one or more MDUs within an area associated with the congested volume, modifying a previously determined path associated with one or more MDUs that are not currently located in an area associated with the congested volume (e.g., MDUs that, based at least in part on planned path data, were originally planning to travel through the congested volume), generating a path for an MDU while ensuring that the path generated avoids the congested volume(s), providing a notification indicating the congested volumes, and the like.

Figure 7:
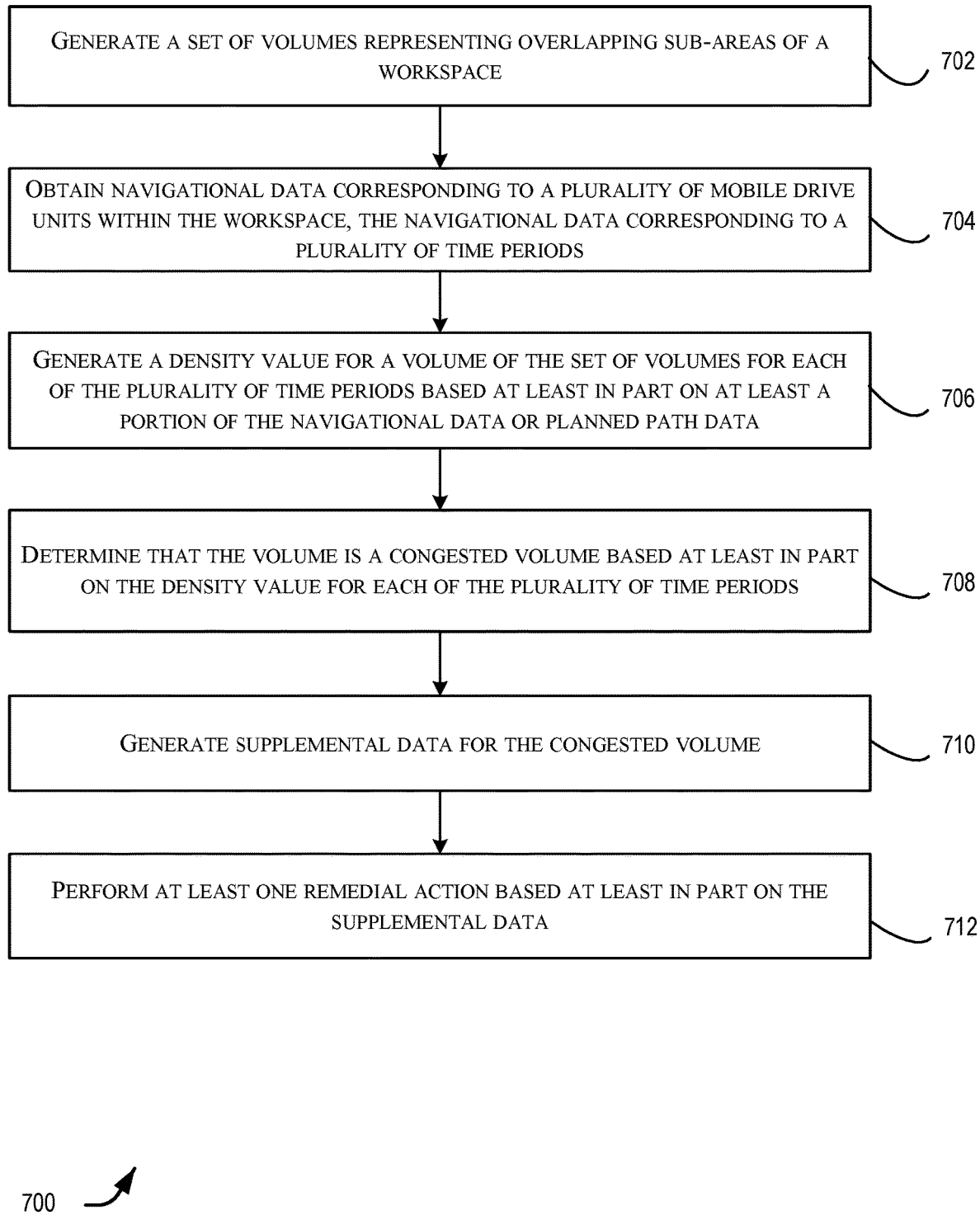
FIG. 7 is a flowchart illustrating another example method for performing one or more remedial actions with respect to detecting congestion within a workspace, in accordance with at least one embodiment.

FIG. 7 is a flowchart illustrating another example method 700 for performing one or more remedial actions with respect to detecting congestion within a workspace, in accordance with at least one embodiment. The method 700 may be performed by the congestion management engine 502 of FIG. 5, an example of the congestion management engine 103 of FIGS. 1-4.

The method may begin at block 702, where a set of volumes representing overlapping sub-areas of a workspace may be generated (e.g., by the congestion management engine 502). In some embodiments, the set of volumes may include any suitable number of vertical volumes and/or any suitable number of horizontal volumes that are generated to cover the whole of the workspace (e.g., workspace 106 of FIG. 1, workspace 202 of FIG. 2). Further aspects of these volumes are discussed in more detail above, with respect to FIG. 2.

At 704, navigational data (or planned path data) corresponding to a plurality of mobile drive units within the workspace may be obtained. In some embodiments, the navigational data (or planned path data) may correspond to a plurality of time periods (e.g., historic time periods, future time periods, respectively). The particular number of time periods utilized may be predetermined and/or adjustable. In some embodiments, the particular number of time periods utilized may be optimized with respect to maximizing a degree of accuracy of congestion detection while minimizing the processing burden for achieving that degree of accuracy.

At 706, a density value for a volume of the set of volumes for each of the plurality of time periods may be generated based at least in part on at least a portion of the navigational data or the planned path data.

At 708, it may be determined that the volume is a congested volume based at least in part on the density value for each of the plurality of time periods. In some embodiments, the congested volume may be determined by first identifying highly dense volumes (e.g., volumes having a density value over a threshold value) of the set of volumes based on a current density value corresponding to a current time. The specific protocol set utilized to identify (classify) a volume as a congested volume may vary. Some examples of a protocol set are discussed above in connection with FIGS. 3 and 5.

At 710, supplemental data may be generated for the congested volume. In some embodiments, the supplemental data may identify attributes of the congestion. In some embodiments, the supplemental data for a volume may correspond to a number of identifiers that correspond to the MDUs located within an area associated with the volume, respective speeds of the MDUs within the volume, an average speed of the MDUs within the volume, a number of identifiers corresponding to components that have been located within an area associated with the volume for at least N number of the previous historical time periods, and the like.

At 712, at least one remedial action may be performed based at least in part on the supplemental data. By way of example, a remedial action may include any suitable combination of modifying a path of one or more of the MDUs within an area associated with the congested volume, modifying a task assignment associated with one or more MDUs within an area associated with the congested volume, modifying a previously determined path associated with one or more MDUs that are not currently located in an area associated with the congested volume (e.g., MDUs that, based at least in part on planned path data, were originally planning to travel through the congested volume), generating a path for an MDU while ensuring that the path generated avoids the congested volume(s), providing a notification indicating the congested volumes, and the like.

Figure 8:
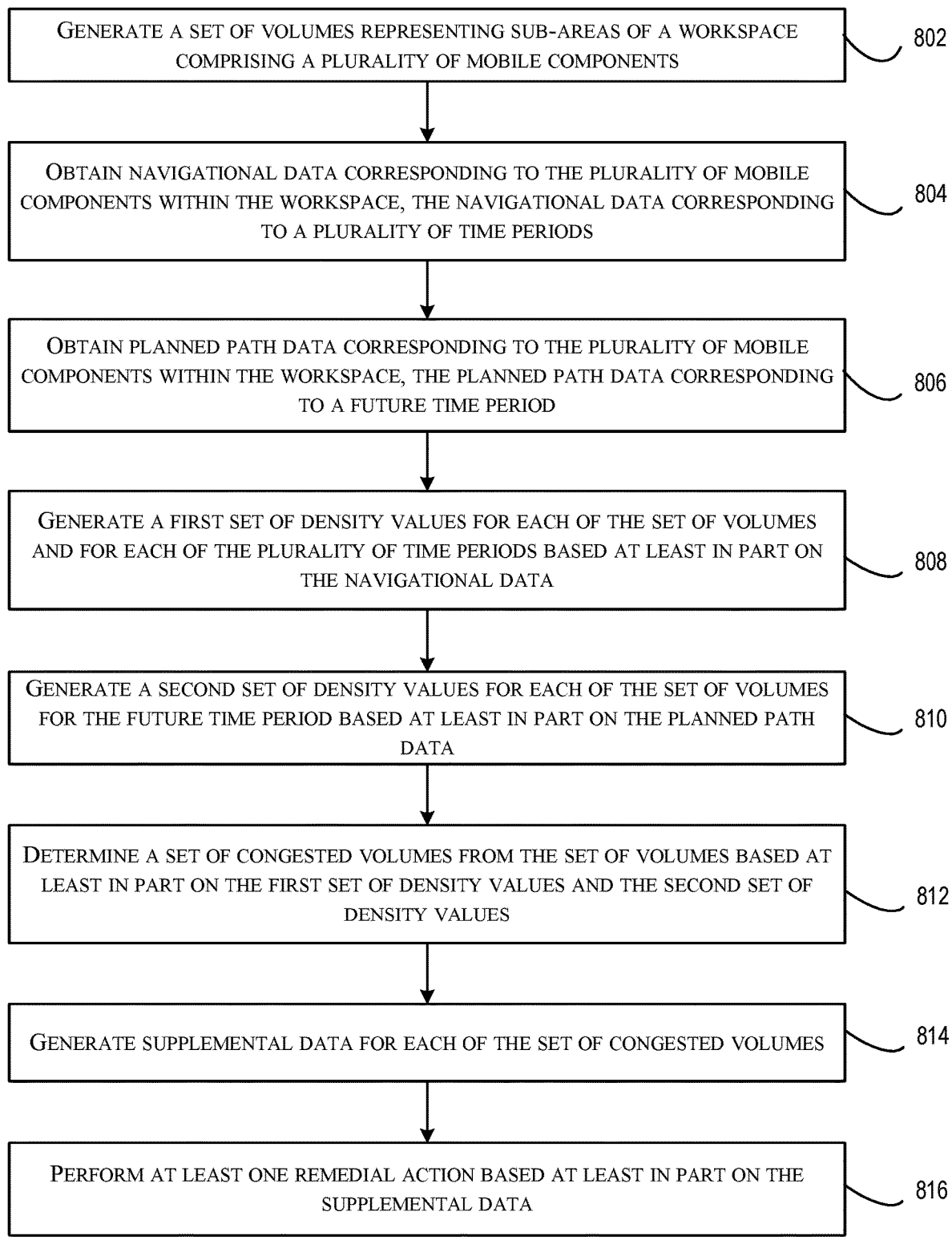
FIG. 8 is a flowchart illustrating yet another example method for performing one or more remedial actions with respect to detecting congestion within a workspace, in accordance with at least one embodiment.

FIG. 8 is a flowchart illustrating yet another example method 800 for performing one or more remedial actions with respect to detecting congestion within a workspace, in accordance with at least one embodiment. A computer-readable storage medium may comprise computer-readable instructions that, upon execution by one or more processors, cause the one or more processors to perform the operations of method 800. The operations of the method 800 may be performed by the congestion management engine 502 of FIG. 5, an example of the congestion management engine 103 of FIGS. 1-4.

The method may begin at block 802, where a set of volumes representing sub-areas of a workspace comprising a plurality of mobile components (e.g., MDUs) may be generated (e.g., by the congestion management engine 502). In some embodiments, the set of volumes may include any suitable number of vertical volumes and/or any suitable number of horizontal volumes that are generated to cover the whole of the workspace (e.g., workspace 106 of FIG. 1, workspace 202 of FIG. 2). Further aspects of these volumes are discussed in more detail above, with respect to FIG. 2.

At 804, navigational data corresponding to a plurality of mobile drive units within the workspace may be obtained. In some embodiments, the navigational data may correspond to a plurality of time periods (e.g., future time periods). The particular number of time periods utilized may be predetermined and/or adjustable. In some embodiments, the particular number of time periods utilized may be optimized with respect to maximizing a degree of accuracy of congestion detection while minimizing the processing burden for achieving that degree of accuracy.

At 806, planned path data corresponding to a plurality of mobile drive units within the workspace may be obtained. In some embodiments, the planned path data may correspond to a future time period (or more than one future time period). The particular number of time periods utilized may be predetermined and/or adjustable. In some embodiments, the particular number of time periods utilized may be optimized with respect to maximizing a degree of accuracy of congestion detection while minimizing the processing burden for achieving that degree of accuracy.

At 808, a first set of density values for each of the set of volumes and for each of the plurality of time periods may be generated based at least in part on the navigational data.

At 810, a second set of density values for each of the set of volumes for the future time period (or for each of the future time periods) based at least in part on the planned path data.

At 812, a set of congested volumes may be determined from the set of volumes based at least in part on the first set of density values and the second set of density values. In some embodiments, the congested volume may be determined by first identifying highly dense volumes (e.g., volumes having a density value over a threshold value) of the set of volumes based on a current density value corresponding to a current time. The specific protocol set utilized to identify (classify) a volume as a congested volume based on navigational data and/or planned path data may vary. Some examples of a protocol set are discussed above in connection with FIGS. 3 and 5.

At 814, supplemental data may be generated for each of the set of congested volumes. In some embodiments, the supplemental data may identify attributes of the congestion. In some embodiments, the supplemental data for a volume may correspond to a number of identifiers that correspond to the MDUs located within an area associated with the volume, respective speeds of the MDUs within the volume, an average speed of the MDUs within the volume, a number of identifiers corresponding to components that have been located within an area associated with the volume for at least N number of the previous historical time periods, and the like.

At 816, at least one remedial action may be performed based at least in part on the supplemental data. By way of example, a remedial action may include any suitable combination of modifying a path of one or more of the MDUs within an area associated with the congested volume, modifying a task assignment associated with one or more MDUs within an area associated with the congested volume, modifying a previously determined path associated with one or more MDUs that are not currently located in an area associated with the congested volume (e.g., MDUs that, based at least in part on planned path data, were originally planning to travel through the congested volume), generating a path for an MDU while ensuring that the path generated avoids the congested volume(s), providing a notification indicating the congested volumes, and the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
    a plurality of mobile drive units located within a sortation facility and individually configured to move items within the sortation facility;
    one or more data networks;
    one or more processors; and
    one or more memories storing computer-readable instructions that, upon execution by the one or more processors, cause the system to at least:
        obtain an electronic representation of an area of the sortation facility;
        generate, utilizing the electronic representation, a set of volumes representing sub-areas of the area;
        obtain navigational data corresponding to each of the plurality of mobile drive units, the navigational data corresponding to a plurality of historical time periods;
        generate a plurality of density values for each of the set of volumes based at least in part on the navigational data corresponding to each of the plurality of historical time periods;
        identify a congested volume from the set of volumes based at least in part on the plurality of density values;
        generate supplemental data for the congested volume, wherein the supplemental data identifies attributes of congestion within the congested volume;
        perform at least one remedial action based at least in part on the supplemental data;
        obtain subsequent navigational data corresponding to at least one of the plurality of mobile drive units;
        determine the congested volume remains congested; and
        in response to determining the congested volume remains congested, forgo generation of subsequent supplemental data for the congested volume thereby reducing a processing burden of the system.

2. The system of claim 1, wherein executing the computer-readable instructions to generate the set of volumes, further causes the system to:
    generate a first subset of vertical volumes representing a first set of sub-areas of the area, wherein at least two of the first subset of vertical volumes overlap one another by a first overlap amount, the first overlap amount being determined based at least in part on the processing burden of the system; and
    generate a second subset of horizontal volumes representing a second set of sub-areas of the area, wherein at least two of the second subset of horizontal volumes overlap one another by a second overlap amount, the second overlap amount being determined based at least in part on the processing burden of the system.

3. The system of claim 2, wherein overlapping the at least two of the first subset of vertical volumes and the at least two of the second subset of horizontal volumes increases an accuracy of identifying the congested volume.

4. The system of claim 1, wherein executing the computer-readable instructions to identify the congested volume, further causes the system to:
    calculate, for a particular volume and based at least in part on the navigational data, a plurality of respective density values corresponding to a number of mobile drive units within the particular volume for each of the plurality of historical time periods;
    identify the congested volume based at least in part on identifying that the plurality of density values for the particular volume comprises density values over a threshold density value more than a threshold number of instances.

5. The system of claim 1, further comprising determining dimensions for the set of volumes based at least in part on a predetermined number of fiducial markers that are to be included in each volume.

6. The system of claim 1, further comprising filtering, from the navigational data, a subset of the navigational data corresponding to a number of mobile drive units that are identified as idle or stationed.

7. A computer-implemented method, comprising:
    generating, by a computing device, a set of volumes representing overlapping sub-areas of a workspace;
    obtaining navigational data or planned path data corresponding to a plurality of mobile drive units within the workspace, the navigational data or the planned path data corresponding to a plurality of time periods;
    generating a density value for a volume of the set of volumes for each of the plurality of time periods based at least in part on at least a portion of the navigational data or the planned path data;
    determining that the volume is a congested volume based at least in part on the density value for each of the plurality of time periods;
    generating supplemental data for the congested volume;
    performing at least one remedial action based at least in part on the supplemental data;

obtaining subsequent navigational data corresponding to at least one of the plurality of mobile drive units;

determining the congested volume remains congested; and in response to determining the congested volume remains congested, forgoing generation of subsequent supplemental data for the congested volume thereby reducing a processing burden of the computing device.

8. The computer-implemented method of claim 7, wherein determining the volume is congested based at least in part on the density value further comprises:

identifying, based at least in part on the navigational data, the volume has corresponding density values that exceed a threshold density value;

determining, based at least in part on the navigational data, a corresponding number of instances that the volume had a corresponding density value exceeding the threshold density value;

identifying the volume is congested based at least in part on determining that the corresponding number of instances for which the volume had the corresponding density value exceed the threshold density value occurred over a threshold number of instances.

9. The computer-implemented method of claim 7, further comprising:

identifying, based at least in part on the navigational data, a set of volumes having corresponding density values that exceed a threshold density value;

determining, based at least in part on the navigational data, a corresponding number of instances that each of the set of volumes had a corresponding density value exceeding the threshold density value; and excluding a particular volume of the set of volumes from a set of congested volumes comprising the volume based at least in part on determining that the corresponding number of instances for which the particular volume had the corresponding density value exceed the threshold density value occurred under a threshold number of instances.

10. The computer-implemented method of claim 7, wherein determining the volume is congested based at least in part on the density value further comprises:

identifying, based at least in part on the navigational data, the volume had corresponding density values that exceed a threshold density value;

determining, based at least in part on the navigational data, a corresponding number of instances that the volume had a corresponding density value exceeding the threshold density value;

identifying, for the volume, that the corresponding number of instances for which the corresponding density value exceeded the threshold density value exceeded a lower threshold value and failed to exceed an upper threshold value;

determining, for the volume, a current density value corresponding to a current time period and a historical density value corresponding to a sequentially preceding historical time period; and including the volume in a set of congested volumes based at least in part on determining that historical density value exceeds the threshold density value.

11. The computer-implemented method of claim 7, wherein the supplemental data for a particular congested volume comprises at least one of: an amount of mobile drive units located within the particular congested volume that have been located within the particular congested volume over a threshold number of sequentially proceeding historical time periods, an average speed of the mobile drive units located within the particular congested volume, or a respective speed of each of the mobile drive units located within the particular congested volume.

12. The computer-implemented method of claim 7, wherein the at least one remedial action comprises at least one of: providing a notification, causing modification of at least one path corresponding to at least one of the plurality of mobile drive units, cancelling a task assignment corresponding to the at least one of the plurality of mobile drive units, reassigning the task assignment corresponding to the at least one of the plurality of mobile drive units, or causing at least one path to be generated for at least one of the plurality of mobile drive units based at least in part on the supplemental data.

13. The computer-implemented method of claim 7, further comprising:

obtaining additional planned path data corresponding to the plurality of mobile drive units within the workspace, the additional planned path data corresponding to a future time period;

calculating additional density values for each of the set of volumes for the future time period based at least in part on at least a portion of the additional planned path data;

determining an additional set of congested volumes from the set of volumes based at least in part on the additional density values;

calculating additional supplemental data for each of the additional set of congested volumes; and performing at least one additional remedial action based at least in part on the additional supplemental data.

14. A non-transitory computer-readable storage medium comprising computer-readable instructions that, upon execution by one or more processors of a computing device, cause the computing device to perform operations comprising:

generating a set of volumes representing sub-areas of a workspace comprising a plurality of mobile components;

obtaining navigational data corresponding to the plurality of mobile components within the workspace, the navigational data corresponding to a plurality of historic time periods;

obtaining planned path data corresponding to the plurality of mobile components within the workspace, the planned path data corresponding to a future time period;

generating a first set of density values for each of the set of volumes and for each of the plurality of historic time periods based at least in part on the navigational data;

generating a second set of density values for each of the set of volumes for the future time period based at least in part on the planned path data;

determining a set of congested volumes from the set of volumes based at least in part on the first set of density values and the second set of density values;

generating supplemental data for each of the set of congested volumes;

performing at least one remedial action based at least in part on the supplemental data;

obtaining subsequent navigational data corresponding to at least one of the plurality of mobile components;

determining a congested volume of the set of congested volumes remains congested; and in response to determining the congested volume remains congested, forgoing generation of subsequent supplemental data for the congested volume thereby reducing a processing burden of the computing device.

15. The non-transitory computer-readable storage medium of claim 14, wherein executing the computer-readable instructions to determine the set of congested volumes from the set of volumes causes the computing device to perform further operations comprising:
  determining a number of instances the first set of density values corresponding to a volume of the set of volumes exceeded a threshold density value; and
  associating the volume as one of the set of congested volumes based at least in part on determining that the number of instances exceeds a threshold number of instances.

16. The non-transitory computer-readable storage medium of claim 14, wherein executing the computer-readable instructions to determine the set of congested volumes from the set of volumes causes the computing device to perform further operations comprising:
  determining a number of instances that the first set of density values corresponding to a volume of the set of volumes exceeded a threshold density value; and
  excluding the volume from the set of congested volumes based at least in part on determining that the number of instances is less than a threshold number of instances.

17. The non-transitory computer-readable storage medium of claim 14, wherein executing the computer-readable instructions to determine the set of congested volumes from the set of volumes causes the computing device to perform further operations comprising:
  determining a number of instances that the first set of density values corresponding to a volume of the set of volumes exceeded a threshold density value;
  identifying that the number of instances was greater than a lower threshold value and less than an upper threshold value;
  determining a most recent density value for the volume corresponding to a most recent time period of the historic time periods; and
  associating the volume as one of the set of congested volumes based at least in part on determining that most recent density value exceeds the threshold density value.

18. The non-transitory computer-readable storage medium of claim 14, wherein executing the computer-readable instructions to calculate the second set of density values causes the computing device to perform further operations comprising:
  calculating, based at least in part on the planned path data, a density value corresponding to the future time period, the density value being associated with a volume of the set of volumes;
  determining that the density value exceeds a threshold density value; and
  associating the volume as one of the set of congested volumes based at least in part on determining that the density value exceeds the threshold density value.

19. The non-transitory computer-readable storage medium of claim 14, wherein the workspace includes a plurality of physical markers, and wherein executing the computer-readable instructions to generate the set of volumes causes the computing device to perform further operations comprising:
  generating a first set of volumes of a first fixed size;
  generating a second set of volumes of the first fixed size, each of the second set of volumes being generated to partially overlap at least one of the first set of volumes;
  generating a third set of volumes of a second fixed size; and
  generating a fourth set of volumes of the second fixed size, each of the fourth set of volumes being generated to partially overlap at least one of the third set of volumes.

20. The non-transitory computer-readable storage medium of claim 14, wherein executing the computer-readable instructions causes the computing device to perform further operations comprising:
  identifying, based at least in part on the navigational data, a set of mobile components associated with an idle or a stationed state; and
  filtering corresponding navigational data of the set of mobile components associated with the idle or the stationed state from the navigational data prior to calculating the first set of density values.

* * * * *